US 6,751,515 B2

(12) United States Patent
Moore

(10) Patent No.: US 6,751,515 B2
(45) Date of Patent: Jun. 15, 2004

(54) YIELD MAPPING

(75) Inventor: Mark Ramon Moore, Banbury (GB)

(73) Assignee: AGCO Limited (GB)

( * ) Notice: Subject to any disclaimer, the term of this patent is extended or adjusted under 35 U.S.C. 154(b) by 8 days.

(21) Appl. No.: 09/989,678

(22) Filed: Nov. 20, 2001

(65) Prior Publication Data

US 2002/0091458 A1 Jul. 11, 2002

(30) Foreign Application Priority Data

May 25, 1999 (GB) ................................................ 9912020

(51) Int. Cl.$^7$ .............................................. G06F 19/00
(52) U.S. Cl. ................ 700/110; 56/10.2 C; 56/10.2 D; 56/10.2 E; 702/5
(58) Field of Search .............................. 700/110; 702/5; 56/10.2 A, 10.2 C, 10.2 G, 10.2 D, DIG. 15, 10.2 E; 460/1

(56) References Cited

U.S. PATENT DOCUMENTS

| | | | | |
|---|---|---|---|---|
| 5,957,304 A | * | 9/1999 | Dawson | 209/552 |
| 6,058,351 A | * | 5/2000 | McCauley | 702/5 |
| 6,121,782 A | * | 9/2000 | Adams et al. | 324/689 |
| 6,212,862 B1 | * | 4/2001 | Staub | 56/10.2 A |
| 6,272,819 B1 | * | 8/2001 | Wendte et al. | 56/10.2 E |

* cited by examiner

Primary Examiner—Albert W. Paladini
(74) Attorney, Agent, or Firm—MacMillan, Sobanski & Todd, LLC

(57) ABSTRACT

A method of collecting yield data from a harvesting machine includes the steps of establishing a first data set comprising raw data by continuously recording yield and position data periodically at data points when the harvesting machine is in a harvesting area. Each data point is tagged with a code indicative of a harvesting parameter of the said harvesting machine. A filtering process is applied to the first data set to create a second data set, wherein invalid data is removed by the filtering process. The filtering process includes the step of identifying all data points in the filtering process where the status of at least one harvesting parameter indicates that the harvester is not harvesting.

24 Claims, 25 Drawing Sheets a = average yield of raw data points recorded in narrow swath
b = average yield of interpolated data points in narrow swath
c = average yield of other raw data points within the interpolation area.
d = average yield of interpolated data points within interpolated area (excluding those points recorded in narrow swath)

Incorrect delay for yield
causing yield data off-set

YIELD MAPPING

FIELD OF THE INVENTION

This invention relates to yield mapping, and is particularly concerned with improving the accuracy of yield maps.

BACKGROUND OF THE INVENTION

In recent years it has become customary to monitor a crop's yield during the course of harvesting. In a combine harvester this is often done using a yield monitor, which measures the amount of crop material harvested. There are many types of yield monitors available. One such monitor is described in International Patent application No. 96/38714.

Over the years there has been a tendency for field sizes to increase. Formerly there would have been little variation in yield in any one given field, and as such the farmer could plan his inputs so that they were uniform across the field. However, field sizes have increased by eliminating the boundaries between fields and creating one large field where three or four smaller fields had existed before. The result is that in fields presently farmed, there are often large variations in yield capability across the field.

The availability of reasonably accurate yield monitors, and the need to treat different areas of the same field differently led to the farm management practice known as "precision or site-specific farming", whereby the farmer tailors inputs to requirements.

Precision farming often involves the farmer in equipping his harvesting machine (such as a combine harvester) with a yield monitor and a positioning system so that the crop yield at any given position can be established. The farmer can then use this information to establish a yield map, and in turn an application map. Inputs are then applied to the crop at varying rates according to the application map.

The philosophy behind precision farming is to reduce the total cost of inputs by selecting the amount of inputs according to need. Since inputs are often based on yield maps it is important for the maps to be accurate. It has been noted that there are several possibilities for error in yield monitoring when harvesting a crop with a harvesting machine.

Existing yield meters used on-board combine harvesters have a number of problems, which may lead to errors in yield maps. Existing yield meters function as set out below:

a. Data is only recorded when the machine is harvesting, i.e., the threshing mechanism is engaged, the table is engaged, the combine is travelling more than 1 km/h and the table is below 0.5 m.

b. It is assumed that only valid data is recorded when the combine is in harvest mode.

c. Simple filtering is used to delete large errors in the raw data set.

d. Any remaining errors in the raw data are smoothed during the interpolation process by amalgamating them with accurate data. The interpolation process hides errors in the data set.

Seven different types of error have been identified when monitoring yield and position on a combine harvester, and these errors are listed below:

1. Measured area—the measured area is calculated by multiplying the cutter bar width by the distance travelled by the combine wheels. The width of the cutter bar and the rolling circumference of the wheel are entered into the combine's computer by the operator. As these values are not monitored during harvesting, they are assumed to be constants until manually adjusted. If they deviate from the programmed values, then errors are introduced into the raw yield data set when converting grain flow (kg/s), measured at the yield meter, into grain yield (t/ha).

2. Delay for yield—this is the true position related to the measured grain flow. This represents the time delay from the crop being cut (true position), and travelling through the combine to the point where the grain flow is measured by the yield meter.

3. Lead time—there is a period of time that is required for the combine to fill with grain once it has entered the crop. This lead time is, therefore, the time lapse that is required for the combine to reach a stage when it has filled with grain and is giving a true reading on the yield meter. From this point reliable yield data can be logged.

4. Lag time—this is time required by the combine to empty of grain once it has stopped cutting the crop at the cutter bar. The lag time therefore, represents the time that true yield data can be logged once the combine's cutter bar has left the standing crop.

5. Delayed positioning—this is the offset of the GPS antenna. For practical reasons it is not possible to mount the GPS antenna directly over the cutter bar and it is normally mounted on the cab roof of the combine harvester. The location of the GPS antenna on the cab roof introduces a "positioning offset".

6. Turing on headlands without cutting any crop—errors are recorded in raw data when the combine is turning on the headland with no grain being cut. In this instance 0 t/ha (zero) will be recorded in the data string which will influence the processed yield map.

7. Tramlines—although not an actual error, because of any reduced yield resulting from wheelings, tramlines could have potential to cause a stripping effect in a resulting yield map.

In order for the reader to be better able to understand the errors identified above, they will be described below with reference to Figures.

DETAILED DESCRIPTION OF THE FIGURES

Figure 1:
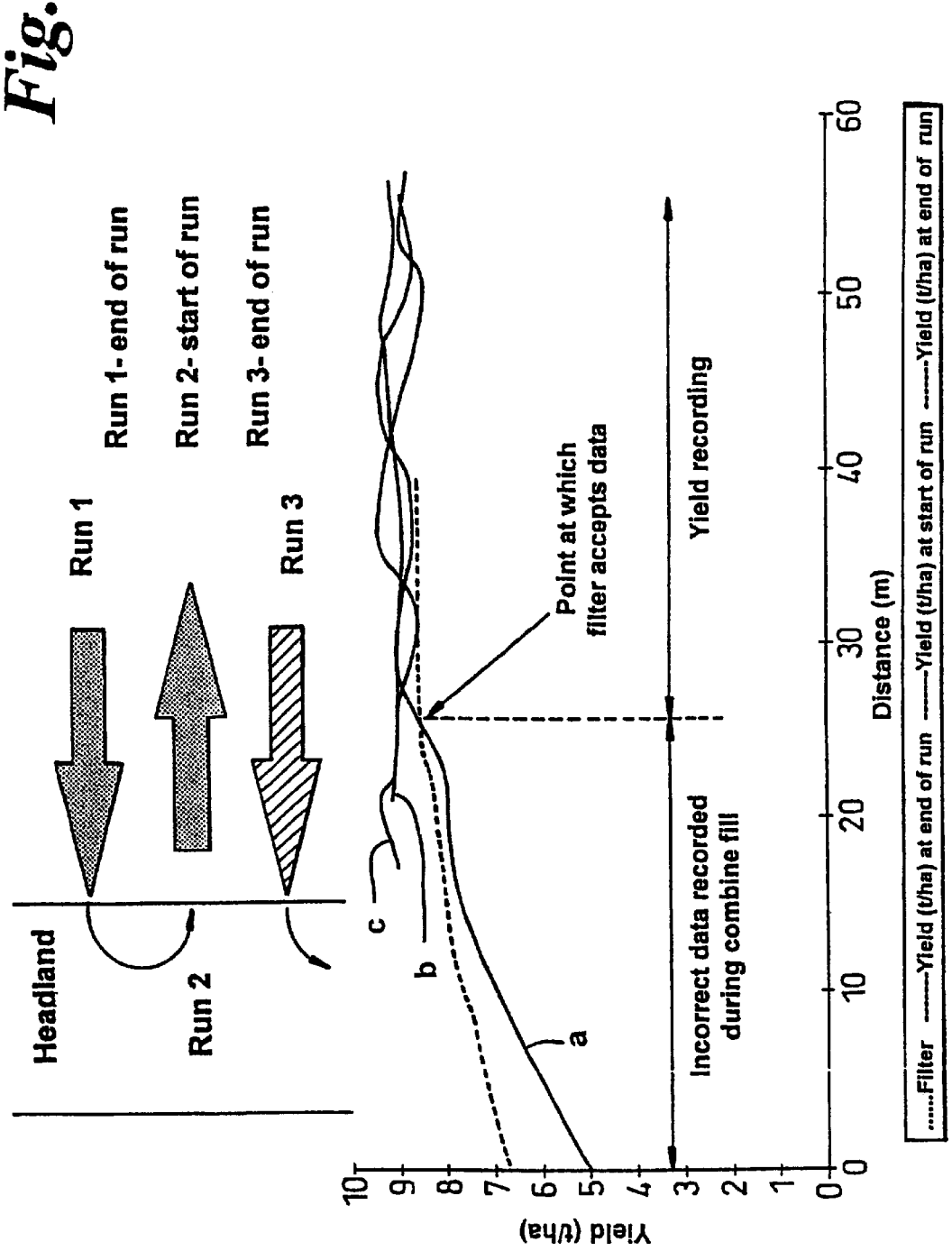
FIG. 1 is a graph illustrating the procedure for establishing a filter to identify grain fill errors.

Referring to FIG. 1, it can be seen that there are three plots showing yield. The plot (a) which intercepts the y-axis contains inaccuracies insofar as the yield data recorded before the combine has been filled do not represent the actual crop yield. As such these data must be removed from the data set.

It is accepted that when the combine enters a crop at a Headland at the start of a run, e.g., Run 1, Run 2, Run 3, as shown in FIG. 1, there is a grain filling phase. The combine is assumed to be full and recording a true indication of yield levels within a field when the yield meter reading has reached a similar level to that of the other two runs of the combine represented by plots (b) and (c). As can be seen from FIG. 1, from the point where yield recording begins the plots (a, b, and c) represent yields which are substantially similar with only minor fluctuations.

Prior art yield recording methods and equipment have sought to eliminate erroneous data by preventing recording of such data. Looking at FIG. 1, the prior art would suggest that recording should not begin to record data until the combine is full. However, as has been outlined above, and will be discussed in greater detail below, problems are associated with attempting to eliminate errors by not recording them.

Erroneous data introduced from a wide variety of sources, as will be described below with reference to the figures. The filter of the invention can be used to filter out these errors.

Measured Area

The measured area function is required to convert grain flow (kg/s) measured by the yield meter into yield (t/ha). The measured area is calculated by multiplying the cutter bar width by the distance travelled by the combine harvester.

Although the width of the cutter bar is fixed, in practice, the actual width of crop cut in any one run will vary, and will be less than the full width of the cutter bar. Usually, the width of crop cut is about 95% of the actual cutter bar width, and in prior art yield recording systems account is taken of this.

During the operation of harvesting a field it is inevitable that the actual width of the crop entering the cutter bar will deviate from 95% of the cutter bar width. To compensate for this the majority of commercially available yield mapping systems incorporate a switch inside the combine cab that allows the operator to quickly adjust and match the pre-programmed width with the actual width of the crop entering the cutter bar. This coarse adjustment, usually related to the cutter bar in quarter steps, allows the measured area to be partially corrected whilst harvesting.

Any deviation from the pre-programmed cutter bar width will result in an error in the calculated yield at the data point.

The other variable used to calculate the measured area is distance travelled, which can be measured, for example, in meters. The distance travelled is calculated by measuring the number of revolutions of the combine harvester wheel and multiplying it by the wheel circumference.

Potential errors in the distance travelled relate to the rolling circumference of the wheel. As the combine's grain tank fills with grain, so the weight of the combine increases, which causes significant tyre deflection thereby altering the rolling circumference of the wheel.

Also, as the combine travels around a corner the outside wheel speeds up and the inside wheel slows down, which introduces an error in to the measured area.

The Effect of Measured Area Errors on Yield Maps

Figure 2:
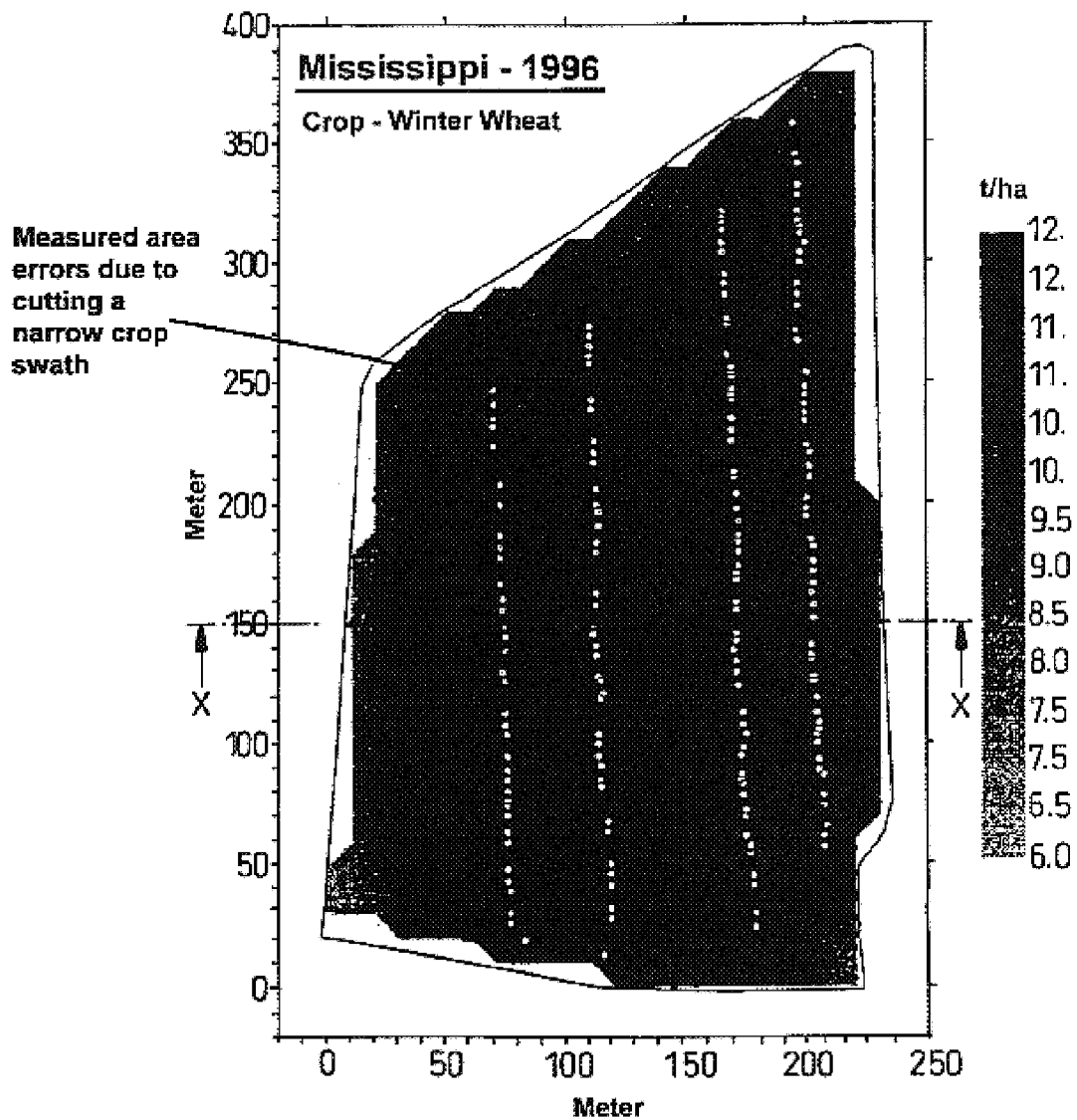
FIG. 2 is a yield map illustrating the effect of narrow crop swaths on yield maps.

The yield map shown in FIG. 2 was generated from a data set containing errors relating to narrow swaths. Visually, the narrow swaths seem to have little effect on the resulting yield map, as there appears to be no low yield strips running parallel with the narrow swath.

Figure 3:
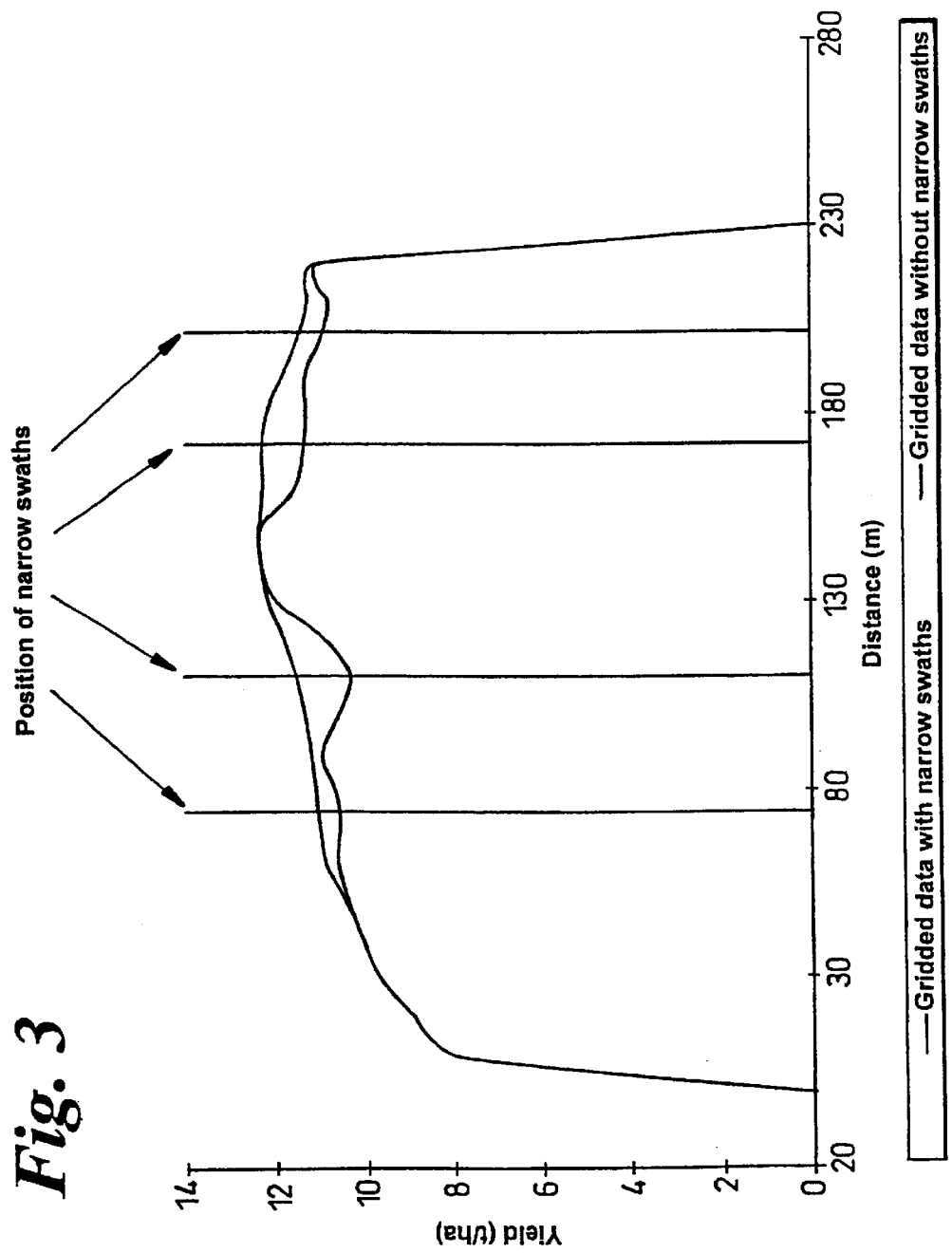
FIG. 3 is a graph illustrating the effect of narrow swaths on the yield map shown in FIG. 2.

However, on more detailed analysis of the map, it can be seen that the narrow swaths have a significant effect. In FIG. 3, plot (a) represents interpolated data generated from a raw yield data set including the points recorded in narrow swaths. The position of the narrow swaths is indicated in FIG. 3. Plot (b) represents interpolated data generated from the same raw data set, but the data points for the narrows swaths were rejected. The error introduced into the yield map at section "XX" is represented by the difference between the two lines.

It can be seen that incorporating erroneous data leads to a false representation of a yield lower that the actual yield.

Figure 4:
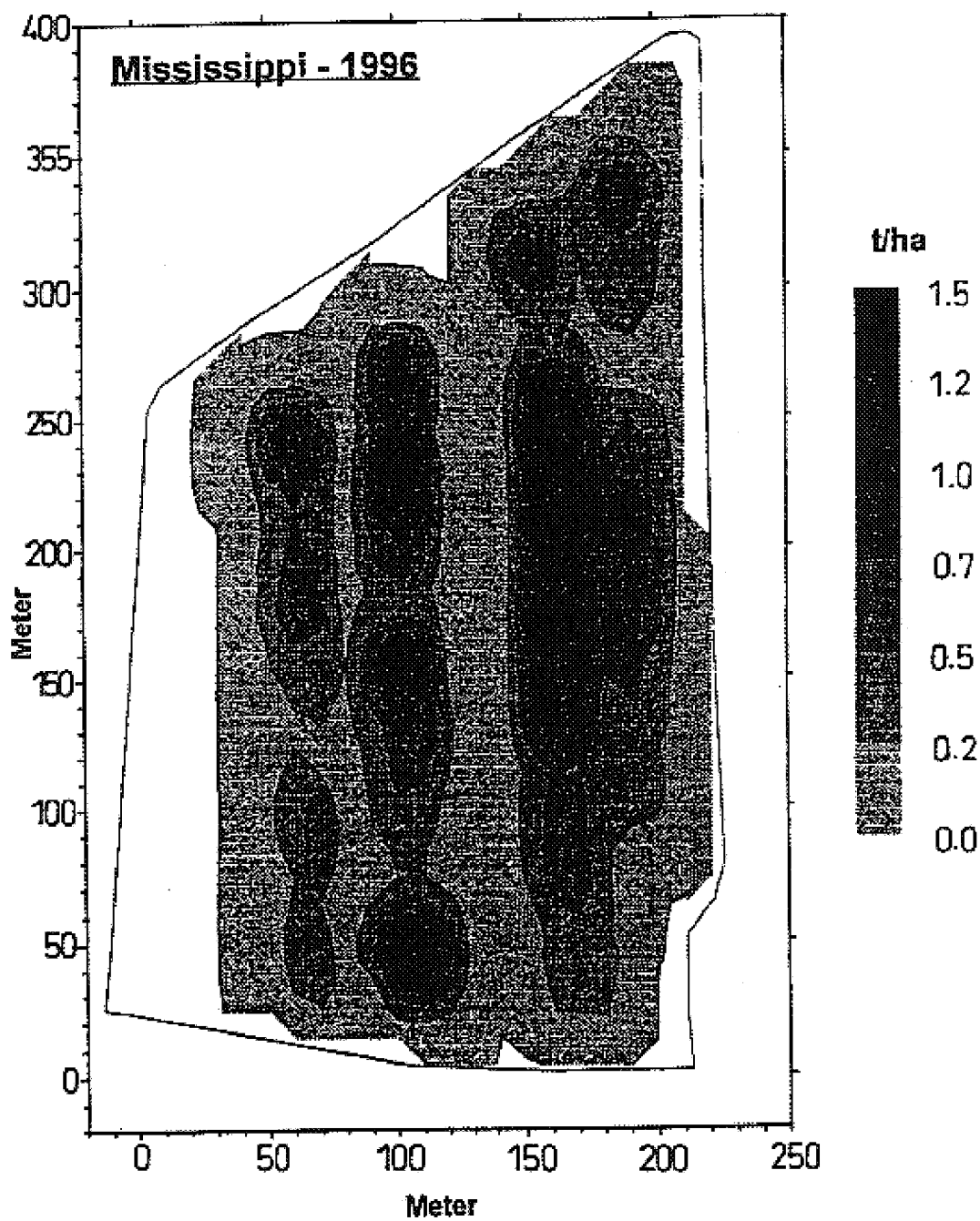
FIG. 4 is a yield map illustrating the extent and distribution of yield map errors relating to measured area.
Figure 5:
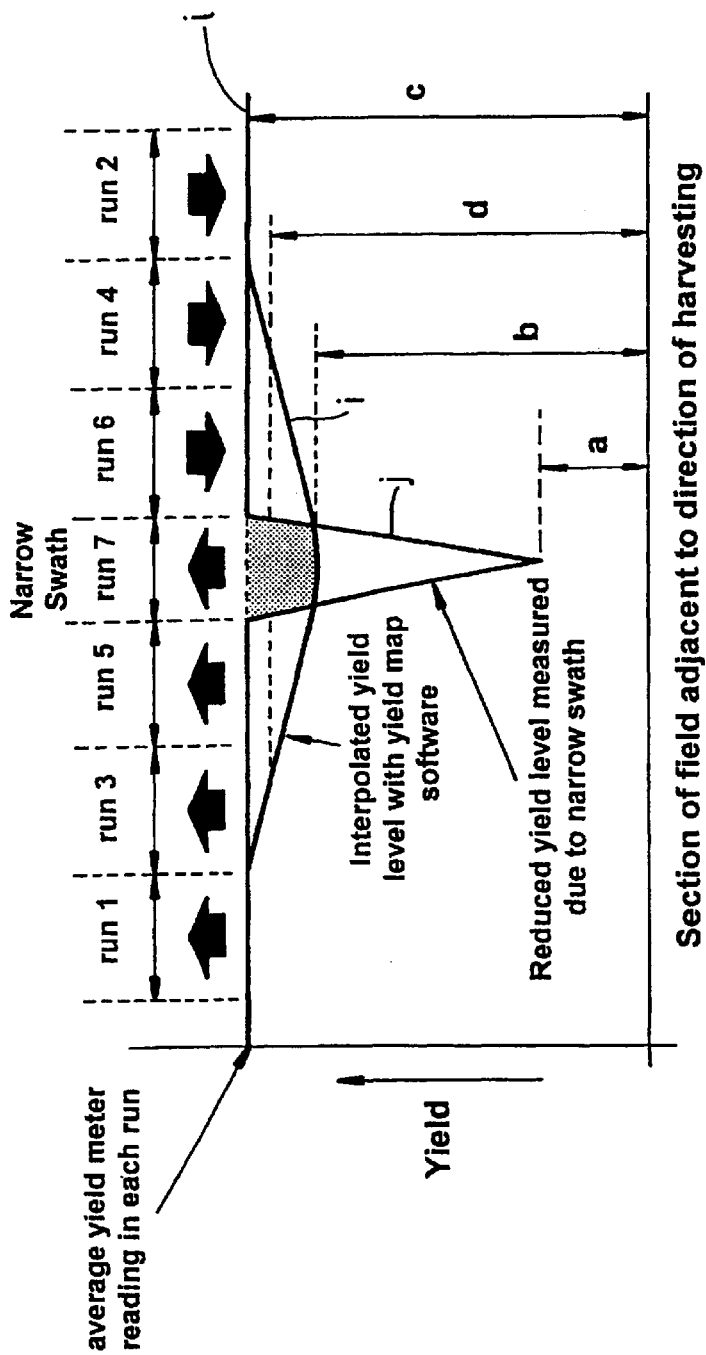
FIG. 5 is a graph illustrating the effect of measured area errors on the interpolation of raw data into a yield map.

Referring now to FIG. 4, there is shown a map illustrating the extent and distribution of yield map errors relating to measured areas. FIG. 5 shows a cross section through a field at 90 degrees to the direction in which it was harvested. It illustrates the ability of the interpolation method to smooth-out measured area errors. Line j represents the average yield in each harvest run obtained from the raw yield data recorded on the combine during harvesting. Run 7 shows a narrow swath within the field which has a low average yield, resulting from incorrect matching of crop width with the pre-programmed width used for area calculations. Line i indicates the yield levels in the field once the raw data has been interpolated by the yield mapping software.

Experiments have shown that the inclusion of erroneous measured area data can result in an indicated yield which is significantly less than the actual yield.

Clearly it is undesirable to include erroneous data in the data used for yield mapping, since the farmer uses the yield map as a basis for decisions on inputs.

Delay for Yield

The delay for yield describes the true position where the crop was cut with the measured yield represented by the delay in time from the crop cut (true position) and the time taken to pass through the combine to the point where the yield is measured by the yield meter.

The flow of grain (kg/sec) through a combine is measured in the elevator by the yield meter and is recorded after the grain has been threshed and cleaned. The measure grain flow at the yield meter must be linked with the position of the combine when the crop was cut at the cutter bar. This relationship is required for two reasons:

(1) the grain flow measured at the yield meter is integrated with the calculated area (cutter bar width x forward speed), at the position where the crop was cut to convert grain flow into yield (t/ha). An incorrect delay for yield will result in yield calculation errors in the combine's computer during periods when the harvester is accelerating or decelerating, and either very high or very low yields will be recorded in the raw data set; and (2) for yield mapping purposes, the calculated yield must be related to and recorded with the actual position where the crop was cut. If an incorrect delay for yield is used, the position of all the recorded yield readings will be off-set from their true position, resulting in a distorted map.

Figure 6:
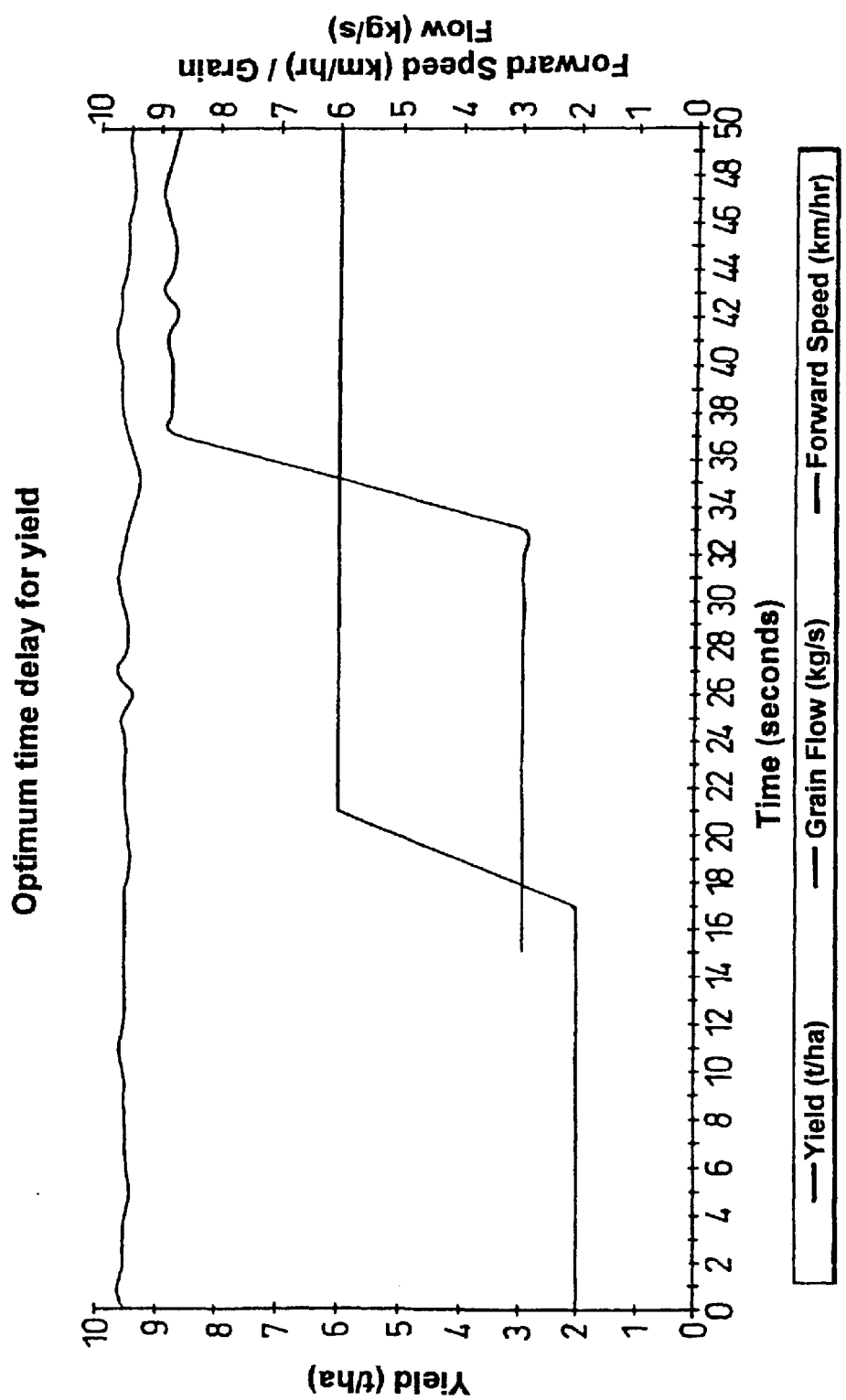
FIG. 6 is a graph illustrating the optimum delay for yield time period.

FIG. 6 illustrates the optimum delay for yield time period. Forward speed is increased from 2 km/h to 6 km/h, thus affecting both the grain flow and the area calculation. At the point where the combine travelled three times faster, both grain flow and area trebled. However, if a correct time delay was introduced, for example 15 seconds, between cutting the crop and measuring the grain flow at the yield meter, the calculated yield would retain its accuracy because of the correct matching of grain flow with area.

Figure 7:
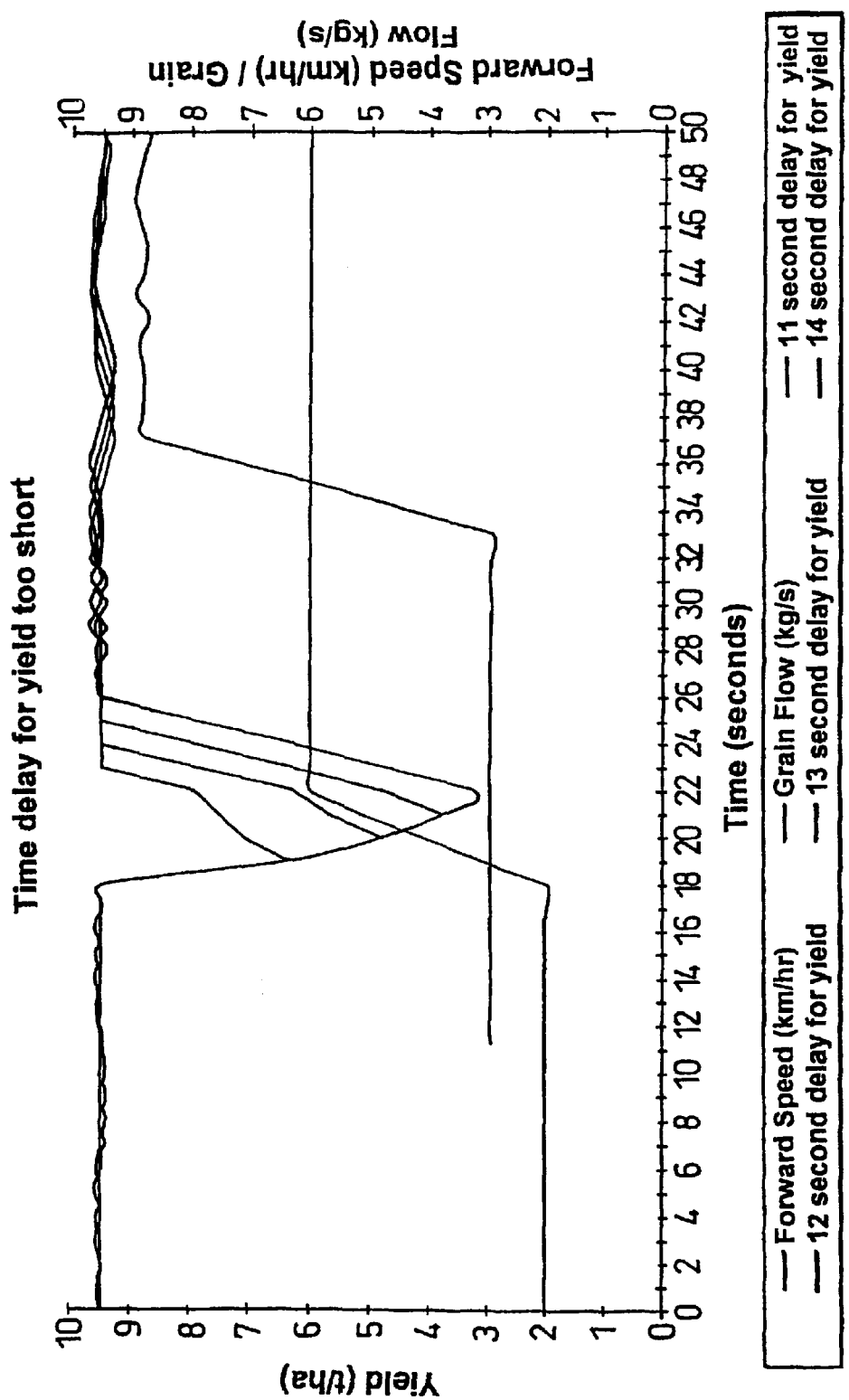
FIG. 7 is a graph illustrating the effect on calculated yield when the delay for yield time period is too short.
Figure 8:
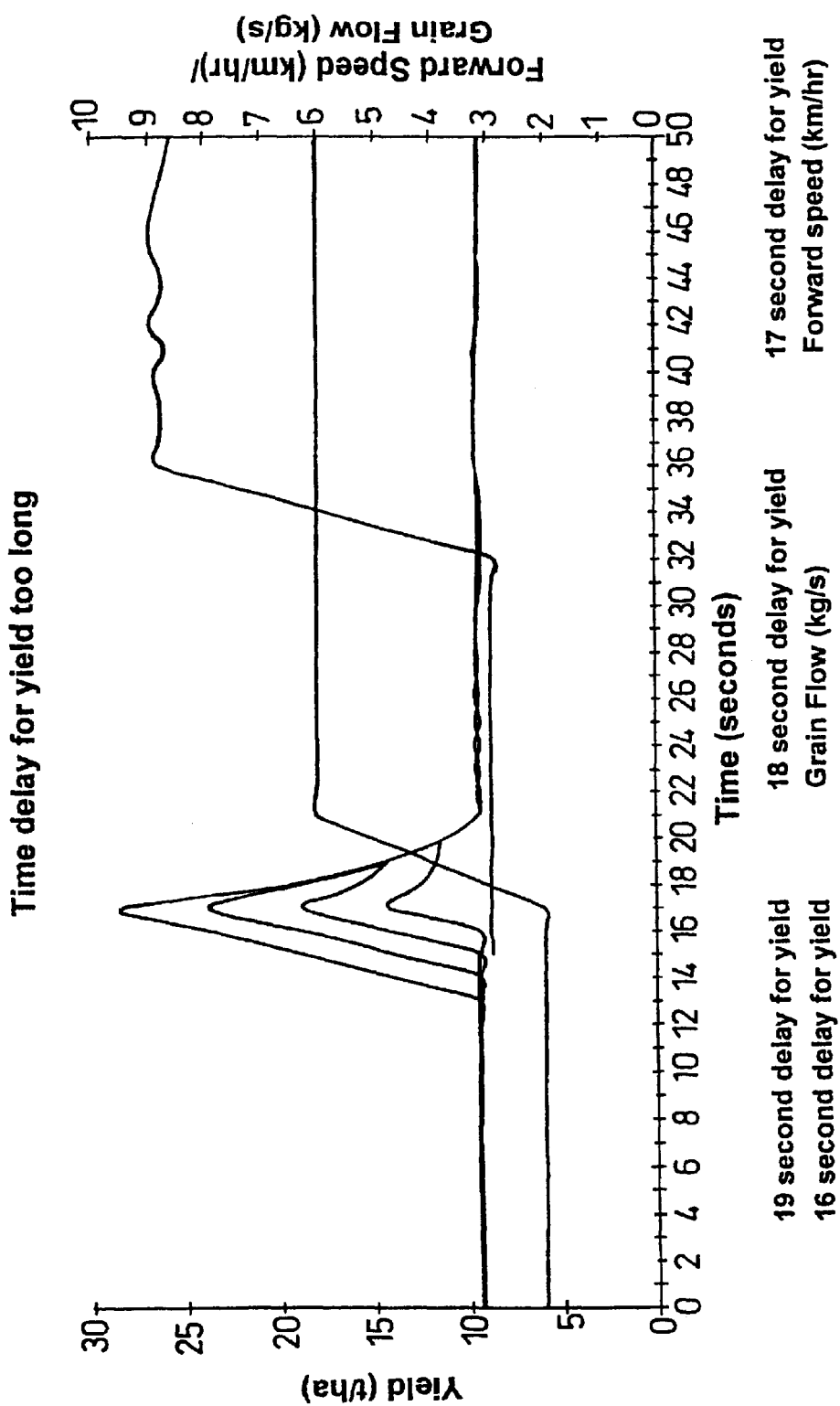
FIG. 8 is a graph illustrating the effect on calculated yield when the delay for yield time period is too long.

FIGS. 7 and 8 illustrate the effect on calculated yield if the delay for yield is too short or too long respectively. If the time delay is too short, a low grain flow will be matched with an increased measured area, thereby producing a false yield reduction until the velocity of the combine becomes stable, and the increased grain flow (due to the acceleration) is matched with the increased area. If the time delay is too long the converse is true and a false increase in grain yield is registered due to the increased area being matched with increased grain flow too late.

The Effect of Incorrect Delay for Yield on the Positioning of Yield Measurements Within a Field Position data is recorded prior to that of yield data, and hence the second function of delay for yield is to correctly match each position and yield measurement within the actual field.

As the harvester cuts the crop, the GPS position of the machine is continually recorded in WGS-84 co-ordinates. These co-ordinates are stored in a buffer inside the combine's computer for the duration of the "delay for yield" time period. At the end of the time period, the yield value measured at the yield meter is attached to the already recorded position. Therefore, if an incorrect delay for yield is used, the yield data will not be matched with its true position within the field, resulting in the yield measurements being off-set.

Figure 9:
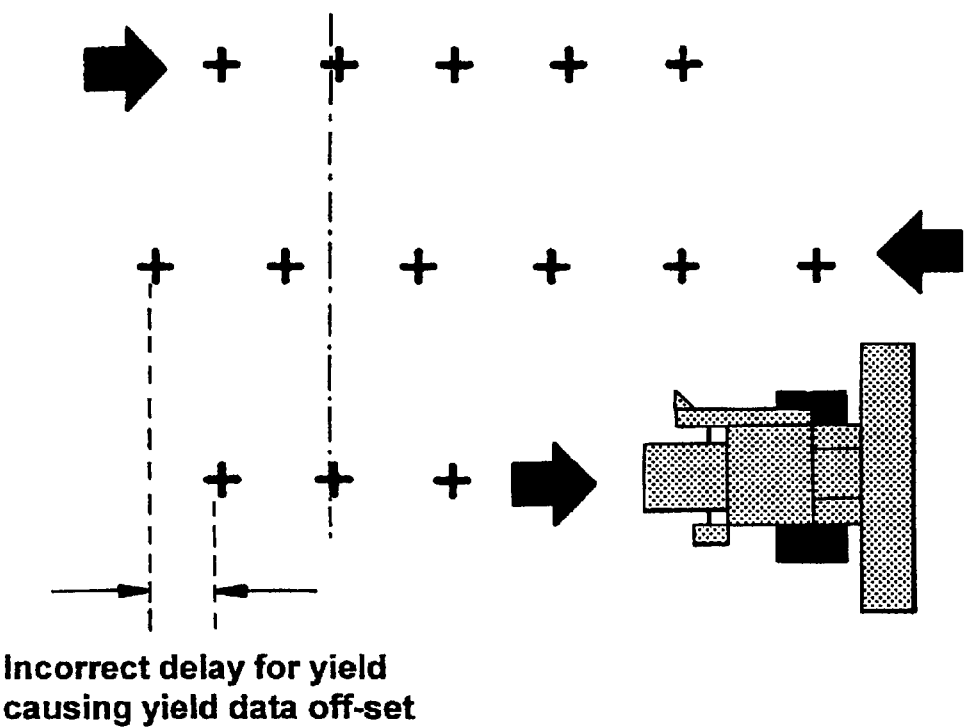
FIG. 9 illustrates schematically the effect of incorrect delay for yield on the positioning of yield measurements within a field.

FIG. 9 illustrates the effect of an incorrect delay for yield on the positioning of yield measurements within a field. When traversing the combine backwards and forwards across the field, the yield data becomes incorrectly positioned. This introduces an error into the yield map, with yield values in each harvest run not being aligned with the values in adjacent runs.

Lead Time

Figure 10:
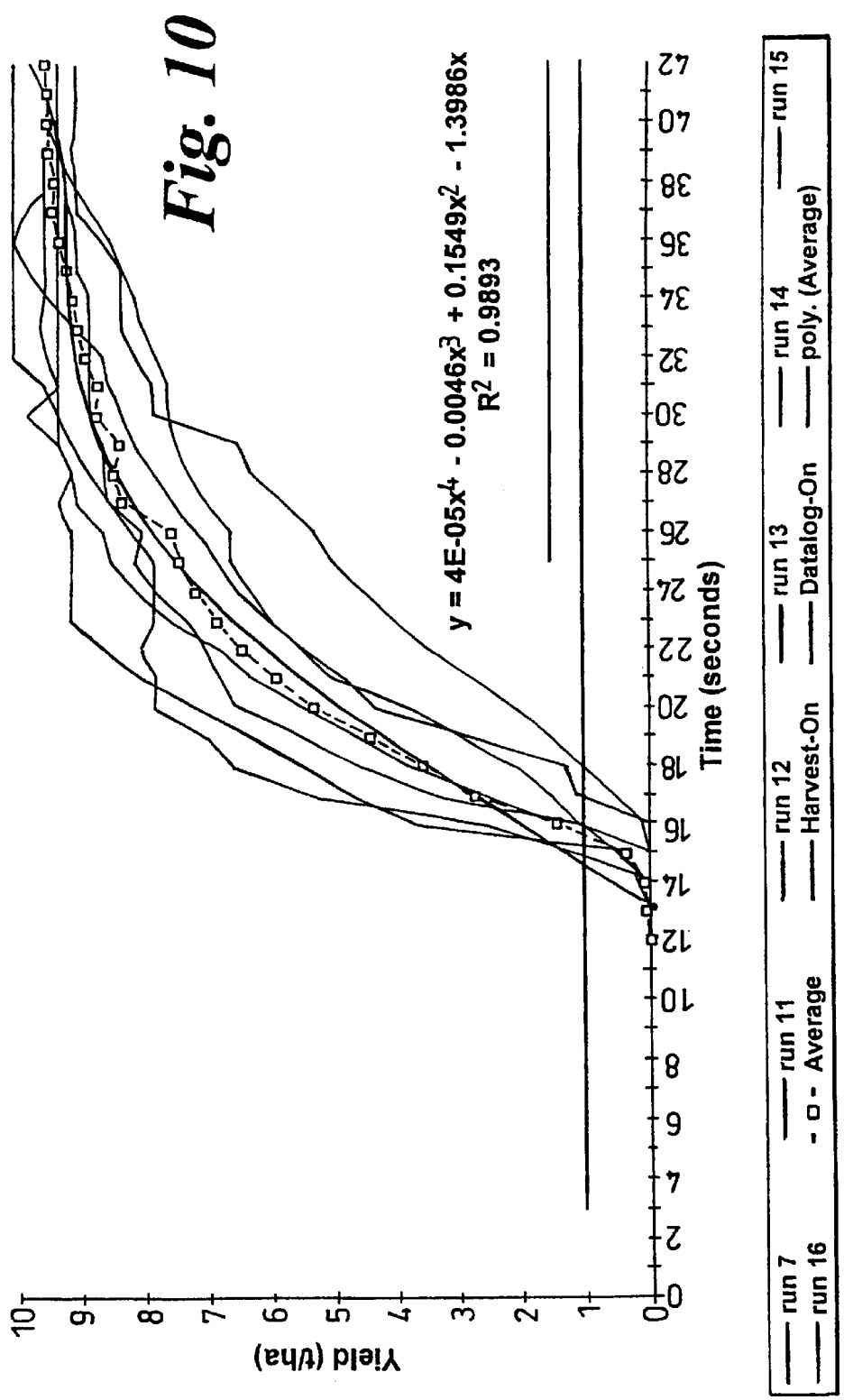
FIG. 10 is a graph showing yield readings of the first forty two seconds of seven harvest runs.

FIG. 10 illustrates the time taken for the yield meter to properly register crop yield. The yield meter only begins to register after 15 seconds, and grain flow then increases rapidly until it levels off. It can be seen that the yield data recorded in the fill period is potentially erroneous. The graph in FIG. 10 suggests that a period of about 36 seconds is required from lowering the cutter bar to maximum recorded yield being recorded by the yield meter. This would suggest that if data recorded in the first 33 seconds were rejected then only valid data would remain. However, lowering the cutter bar below 50 cm above the ground activates the yield meter. The time period of 33 seconds assumes that the cutter bar is lowered 3 seconds prior to entering the crop. It has been found that the time period between lowering the cutter bar and entering the crop is subject to significant variation. This would introduce an error into the recorded yield. The time period of 33 seconds also assumes that the combine is entering a square edged crop. Where the combine is entering a triangular edged crop the combine will take longer to fill with grain and as such the correct yield data will not be recorded after 33 seconds.

The Stages Required to Fill a Combine with Grain

Figure 11:
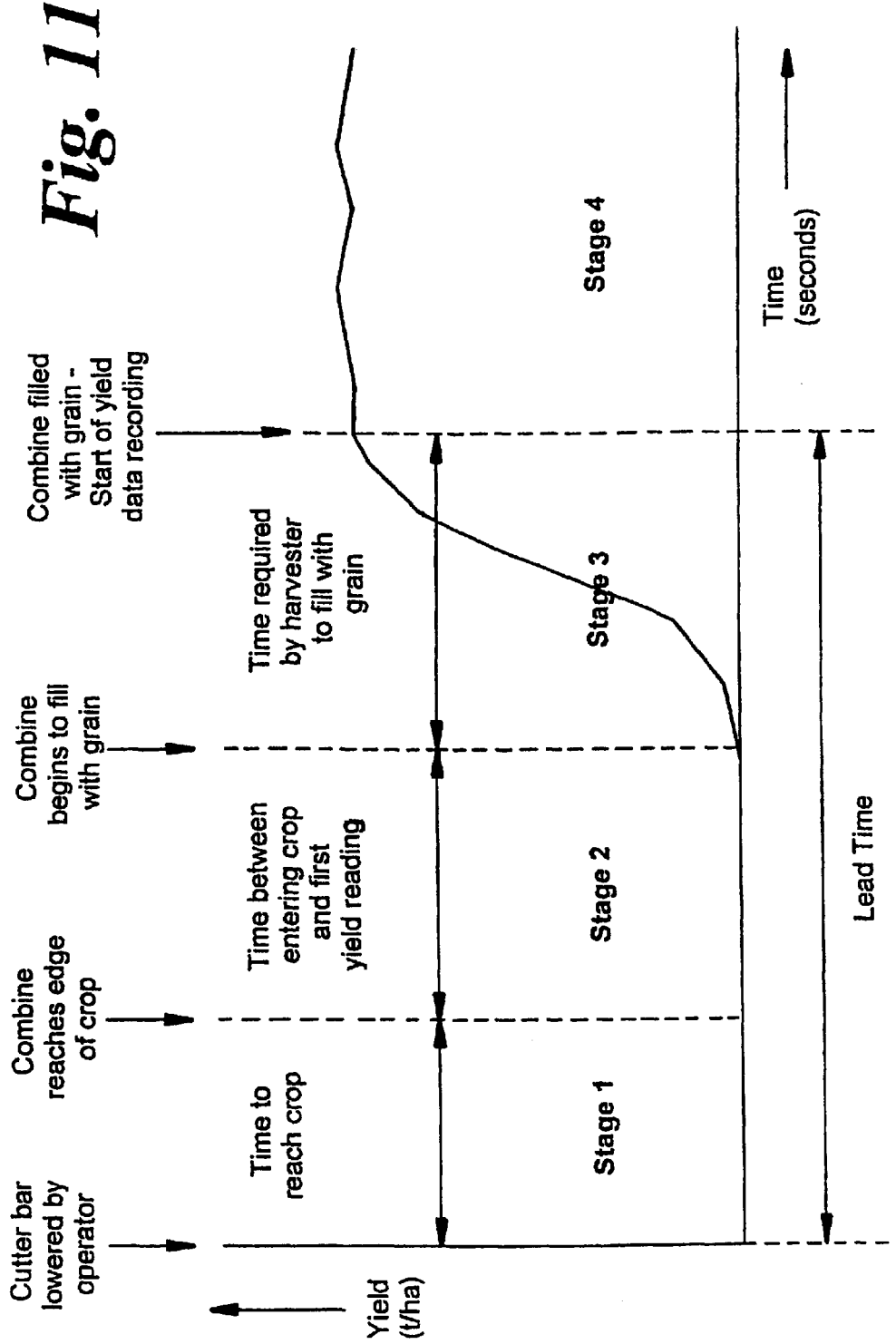
FIG. 11 is a graph illustrating the stages required for a combine to fill with grain.

FIG. 11 illustrates the stages required to fill a combine with grain. The four stages shown in the Figure will be described below:

Stage 1—Time between lowering the cutter bar below a pre-determined limit to the cutting height, for example 50 cm, and reaching the edge of the standing crop. The operator lowers the cutter bar as the combine harvester approaches the edge of the standing crop. As soon as the cutter-bar falls below the pre-determined limit, the start of the lead time, or time delay before yield data is recorded, is activated. The operator drives the combine harvester up to the edge of the crop and the cutter bar begins to cut.

Stage 2—Time for first grain to register at yield meter. As soon as the cutter bar cuts the crop the combine harvester begins to fill with grain. The period of time required for the first grains to be transported through the combine and be registered at the yield meter.

Stage 3—Time for the combine harvester to register correct yield at the yield meter. As the grain cut at a given instant will not pass through the combine as a single unit, there is a gradual increase in grain flow at the yield meter. This is a result of the redistribution of grain within the combine as it flows through the machine. For example, some grain may pass through the system rapidly, being separated at the concave, transported by the grain pan to the shaker shoe falling straight through the sieves; whereas other grain may remain unseparated at the concave, only to be separated later by the straw walkers. However, the grain flow eventually stabilises and it is assumed that the yield meter indicates the yield level. At this point the lead time ends. Yield data is therefore not logged for the period of the lead time.

Stage 4—Yield data is logged as the combine grain transport mechanism is assumed to be full and giving a true reading of yield.

Figure 12:
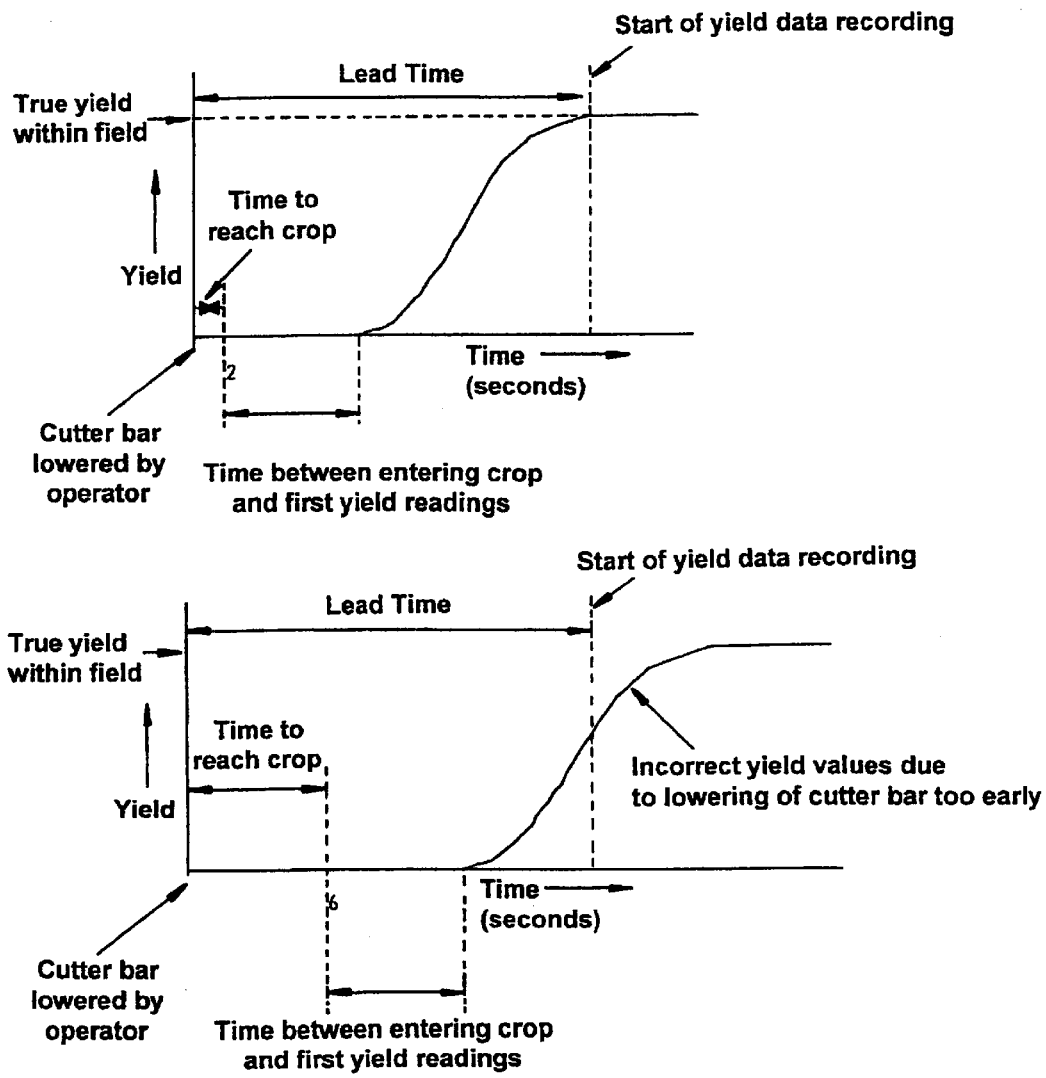
FIG. 12 shows graphs illustrating the effect of varying times between lowering the cutter bar and the harvester entering the crop on yield measurement.

FIG. 12 shows graphs illustrating the effect of the varying the time between lowering the cutter bar and the harvester entering the crop on yield measurement. In the first graph where the cutter bar is lowered 2 seconds before entering the crop, correct yield data is recorded, but in the second graph, where the combine enters the crop 6 seconds after lowering the cutter bar, incorrect yield values are recorded.

The Effect of Incorrect Lead Times on a Yield Map

Figure 13:
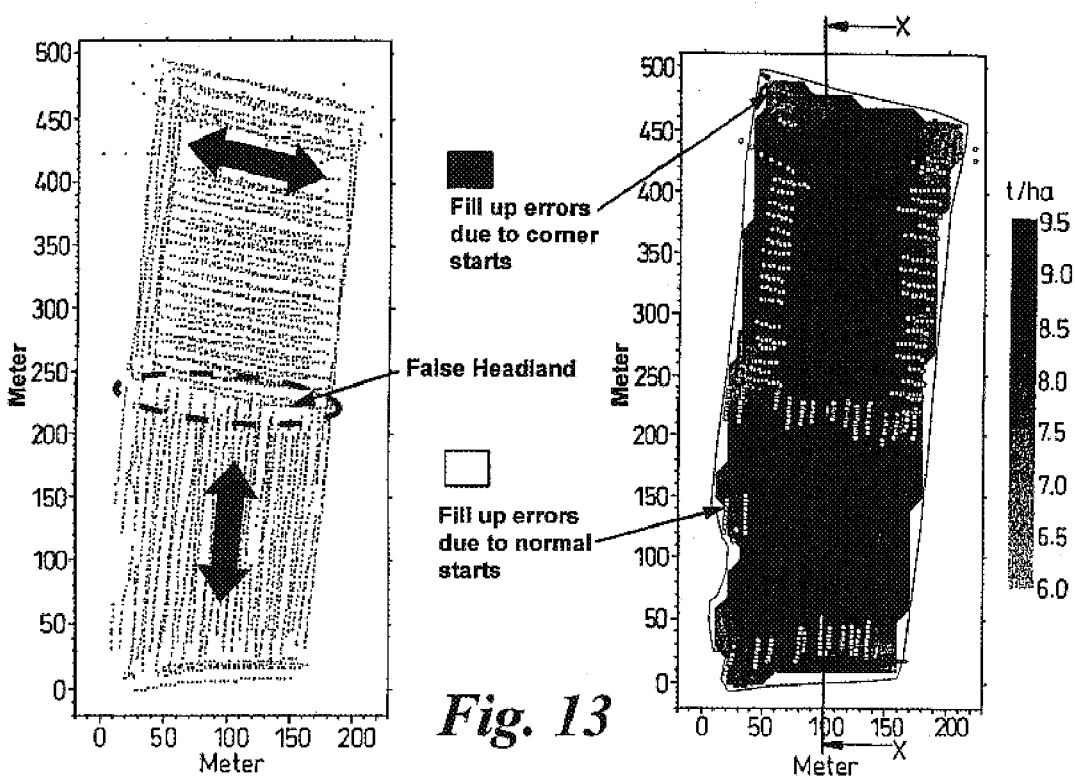
FIG. 13 show yield maps illustrating the effect of incorrect lead time on yield maps.

FIG. 13 illustrates a yield map, and a map showing the direction in which the combine cut two halves of a field. It can be seen that one half of the field was cut across the field, whilst the other half was cut along the length of the field.

The yield map shows a lower yield in the area of the false headland. The lead time used on the combine was 15 seconds. The low yield indicated on the false headland can be attributed to incorrect actual lead times. This is highlighted in FIG. 14.

Figure 14:
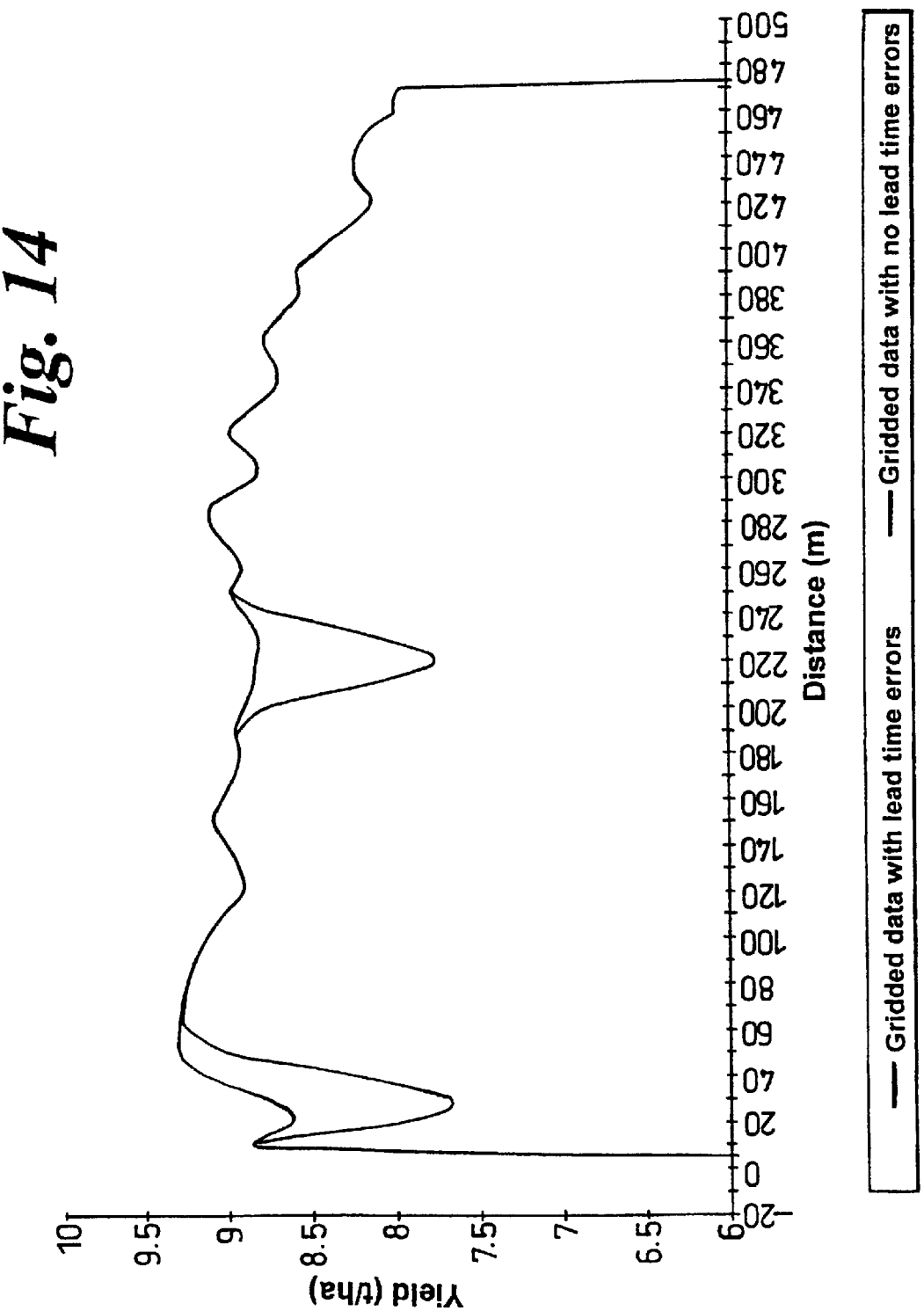
FIG. 14 is a graph illustrating the effect of incorrect lead times on the yield map shown in FIG. 13.
Figure 15:
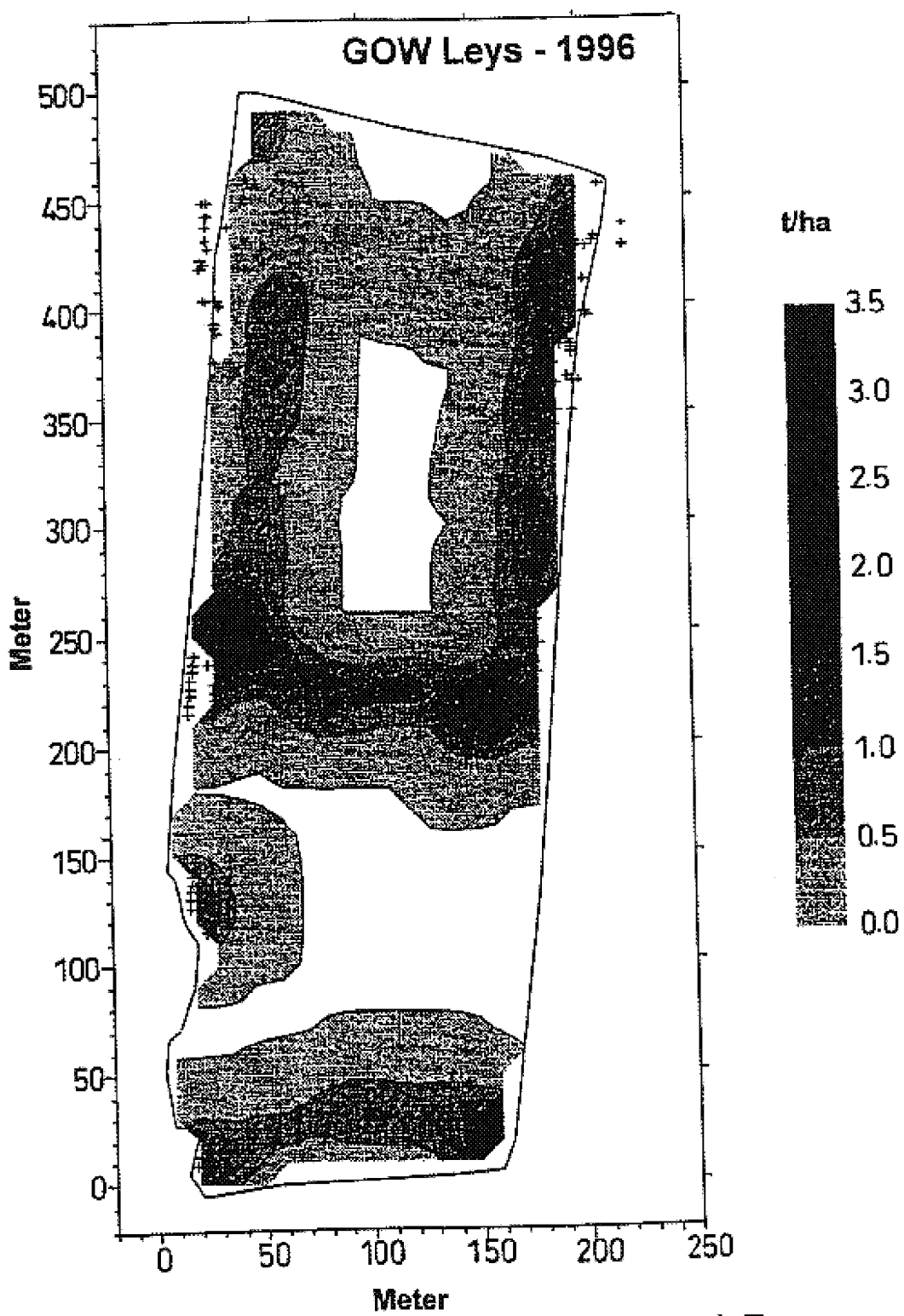
FIG. 15 is a yield map illustrating the extent and distribution of yield map errors relating to a 15 second lead time.
Figure 16:
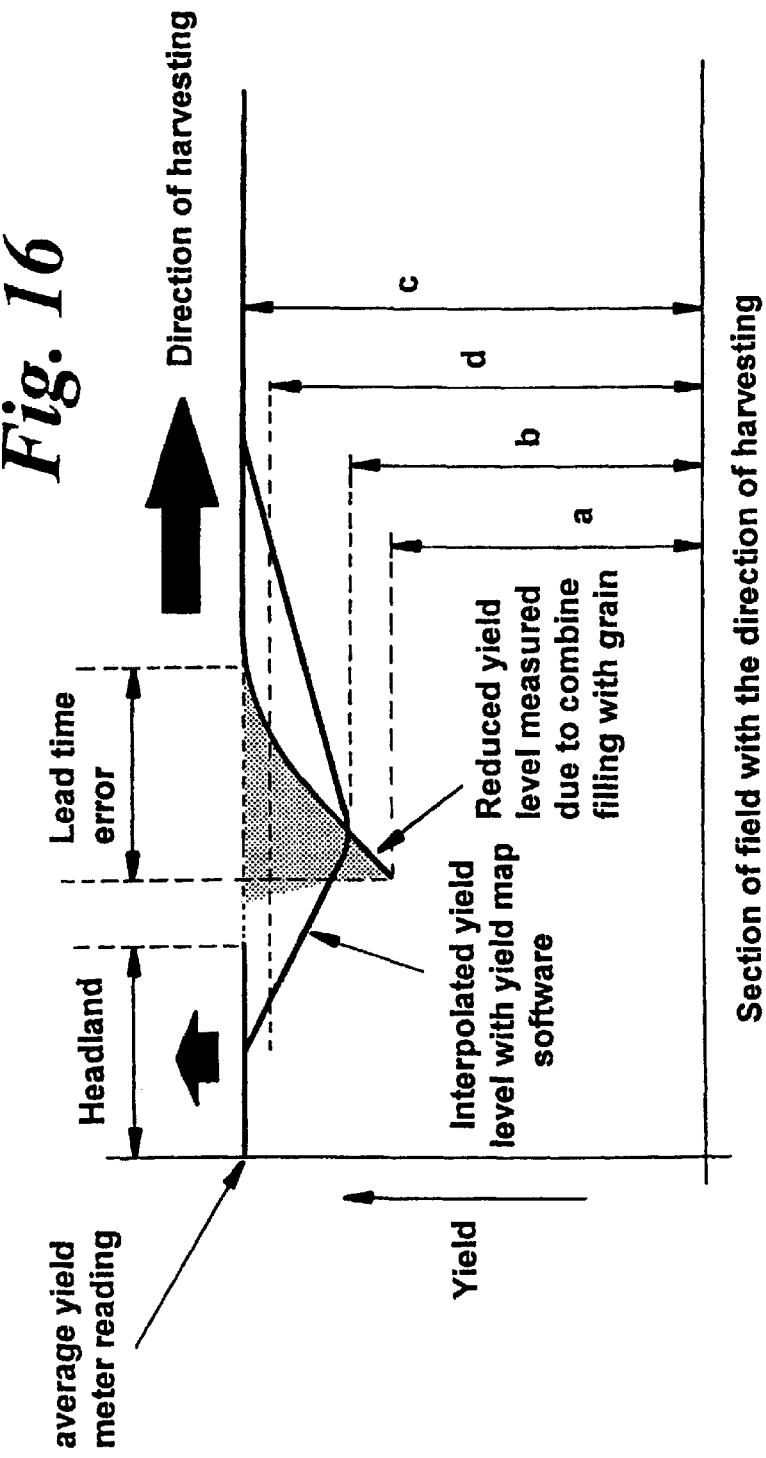
FIG. 16 is a graph illustrating the effect of lead time errors on the interpolation of raw data into a yield map.

FIG. 14 illustrates the section "XX" of the yield map shown in FIG. 13. Plot (a) represents raw data, whilst plot (b) represents interpolated data. By interpolating the raw data a yield reduction is introduced. This is due to the yield data, which includes lead time errors. If the raw data were filtered in accordance with the invention, then such an error in the yield map would not occur.

Lag Time

The lag time is the period required by the combine harvester to empty of grain once it has stopped cutting crop at the cutter bar. Lag time represents the time that true yield data can be logged once the combine's cutter bar has left the crop.

The Stages Required for a Combine to Empty of Grain

Figure 17:
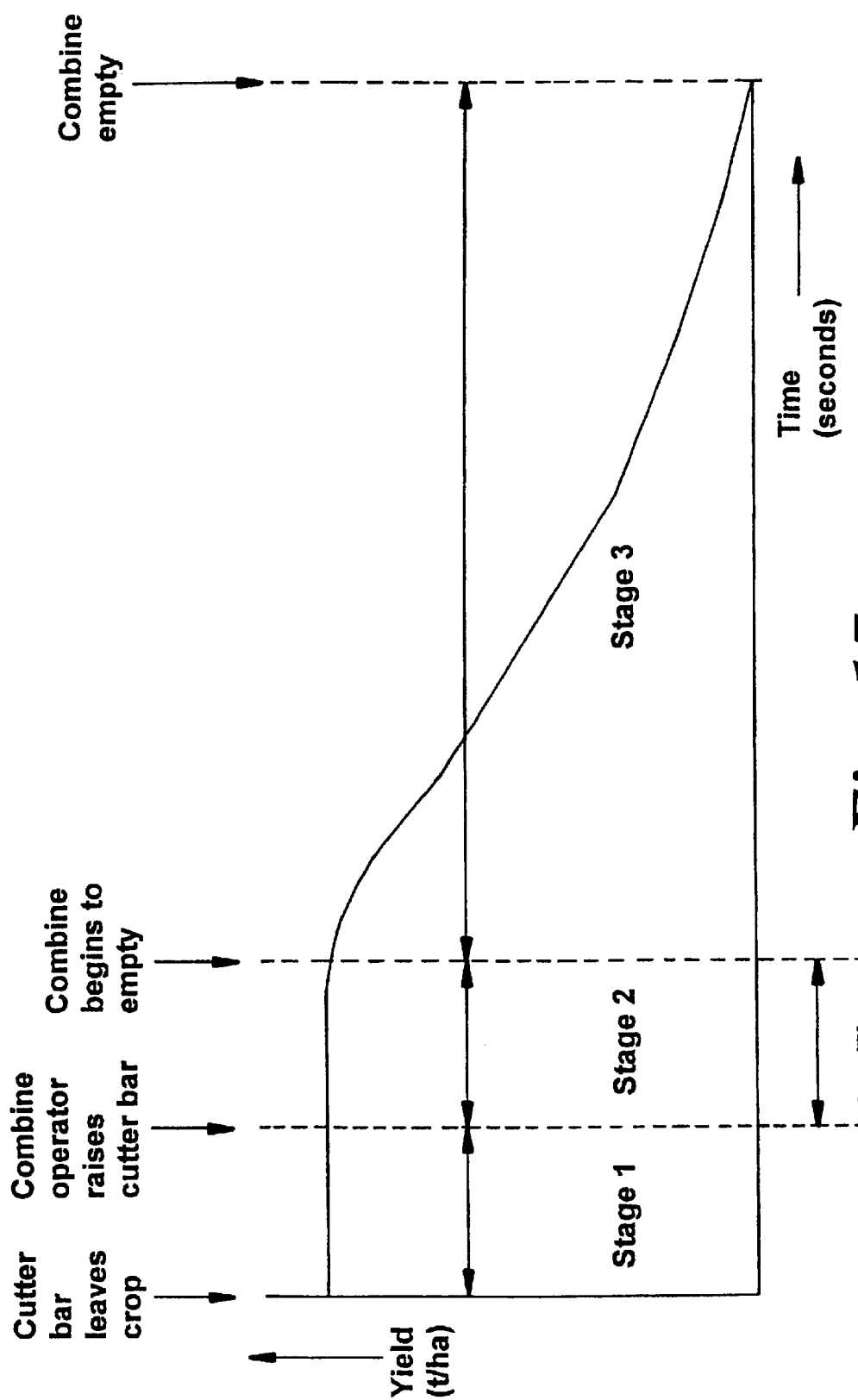
FIG. 17 is a graph illustrating the time required for a combine to empty of grain.

The time required for a combine to empty of grain can be divided up in to three distinct stages as illustrated in FIG. 17.

Stage 1—Time between the combine leaving the crop and the operator raising the cutter bar above a pre-determined height, for example 50 cm. The combine operator raises the cutter bar as soon as the harvester leaves the crop. The operation of raising the cutter bar above 50 cm activates the start of the lag time.

Stage 2—Time between the raising of the cutter bar and the first reduction in grain flow to register at the yield meter. As the combine operator drives the harvester out of the crop and begins to carry out a headland turn, there is a period of time when full grain flow is still being registered at the yield meter. This is valid data and should be included in the raw data set. However, there is a point when grain flow begins to drop as the combine empties in the grain flow measuring area. At this point, the lag time ends and data logging is stopped.

The Influence of Other Variable on Lag Time

Lag time is also influenced by a large number of factors, which are similar to those affecting both the lead time and the flow of crop through the combine. Fixed factors which give consistent lag time for the whole field include the crop type and its moisture content. However, other factors are much more dynamic within the field and can affect the lag time enormously. Again, these relate predominately to the way in which the combine operator harvests the field. For example, the period of time between the harvester leaving the crop and the cutter bar being raised above 50 cm, which triggers the start of the lag time, varies as a result of the combine operator's action response time.

In many commercially available yield mapping systems, the lag time is fixed by the manufacturer and cannot be adjusted. However, some systems do allow the operator to adjust the lag time to suit individual requirements and harvest conditions. This enables the lag time to be adjusted for individual fields and crops, but remains fixed until further adjusted. No account is taken for dynamic circumstances which influence the length of lag time within the field. It is assumed, therefore, that the operator must be consistent between the period of time between the combine harvester leaving the crop and raising the cutter bar above 50 cm. This ensures that the system only records valid yield data.

Figure 18:
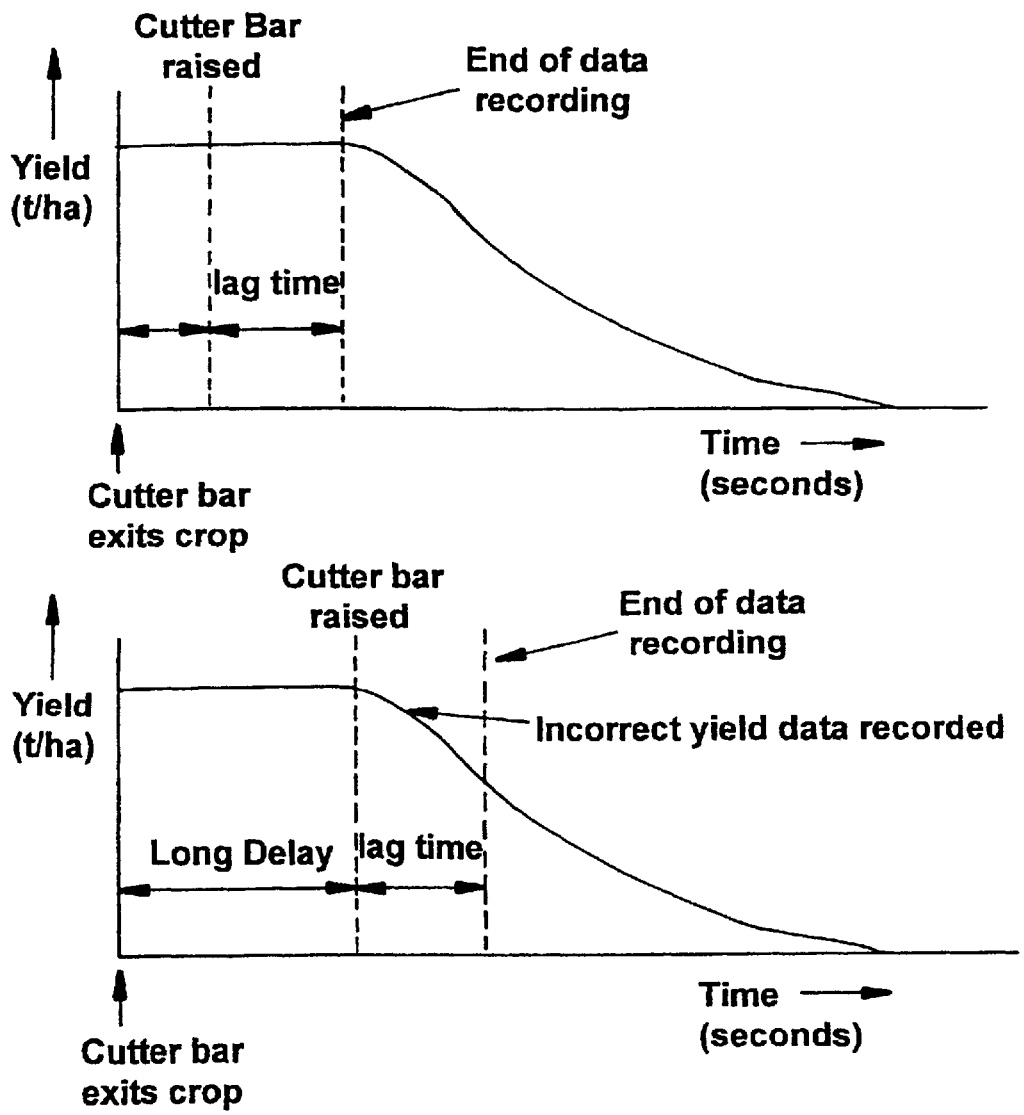
FIG. 18 shows graphs illustrating the effect of varying times between exiting the crop and raising the cutter bar on yield measurement.

In FIG. 18 plot (a) represents the cutter bar being raised as soon as the combine harvester exits the crop. This represents a short time between exiting the crop and raising the cuter bar. However, the operator is not always consistent in raising the cutter bar at the same stage of leaving the crop. Plot (b) represents the operator raising the cutter bar some time after leaving the crop. As lag time is not dynamic, the increase in time before lifting the cutter bar when exiting the crop results in yield values recorded when the combine is still emptying of grain. The reduced grain flow in this emptying period, when recorded by the yield mapping system gives invalid raw data.

Figure 19:
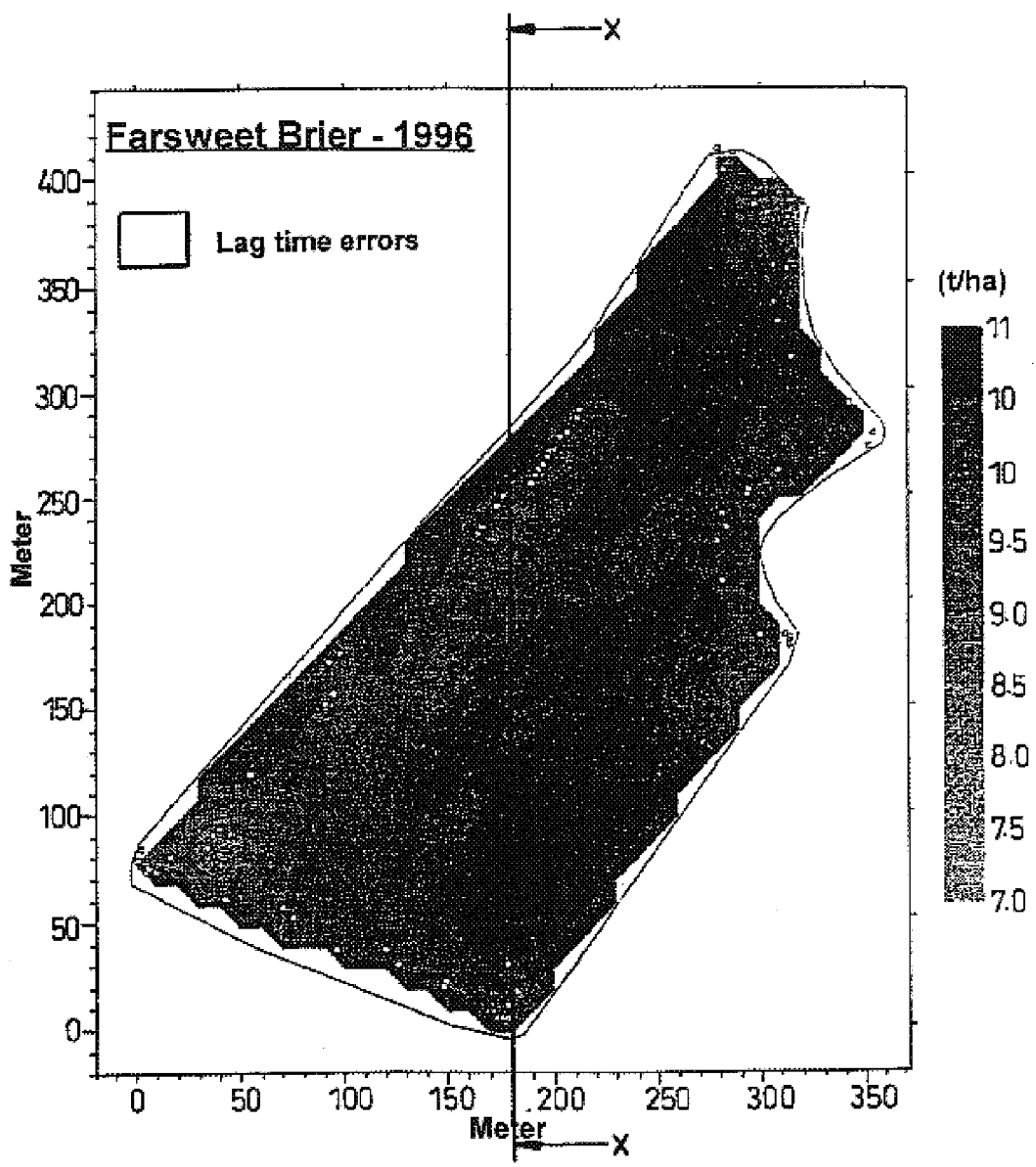
FIG. 19 is a yield map showing the occurrence of lag time errors.
Figure 20:
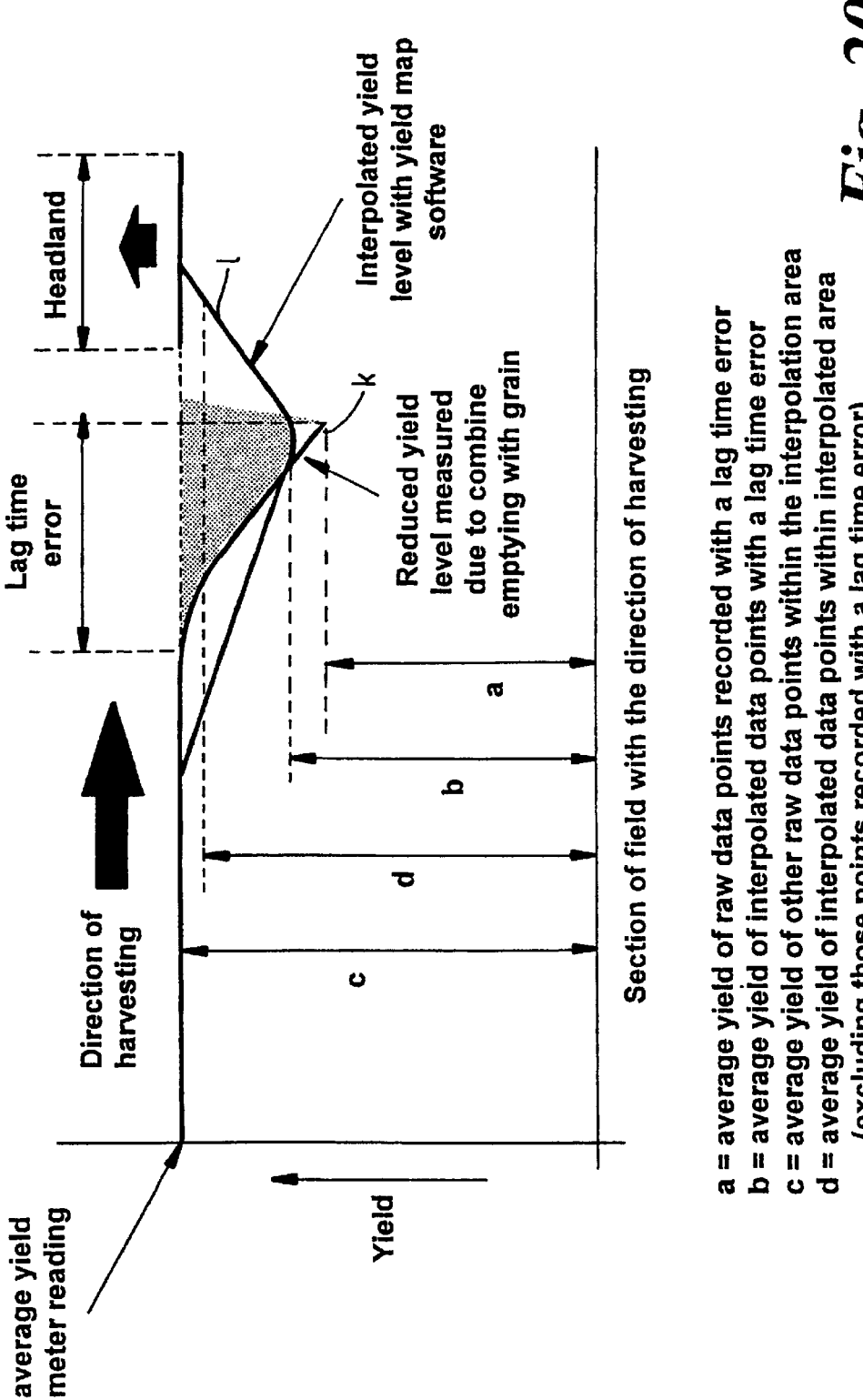
FIG. 20 is a graph showing the effect of lag time errors on the interpolation of raw data into a yield map.
Figure 21:
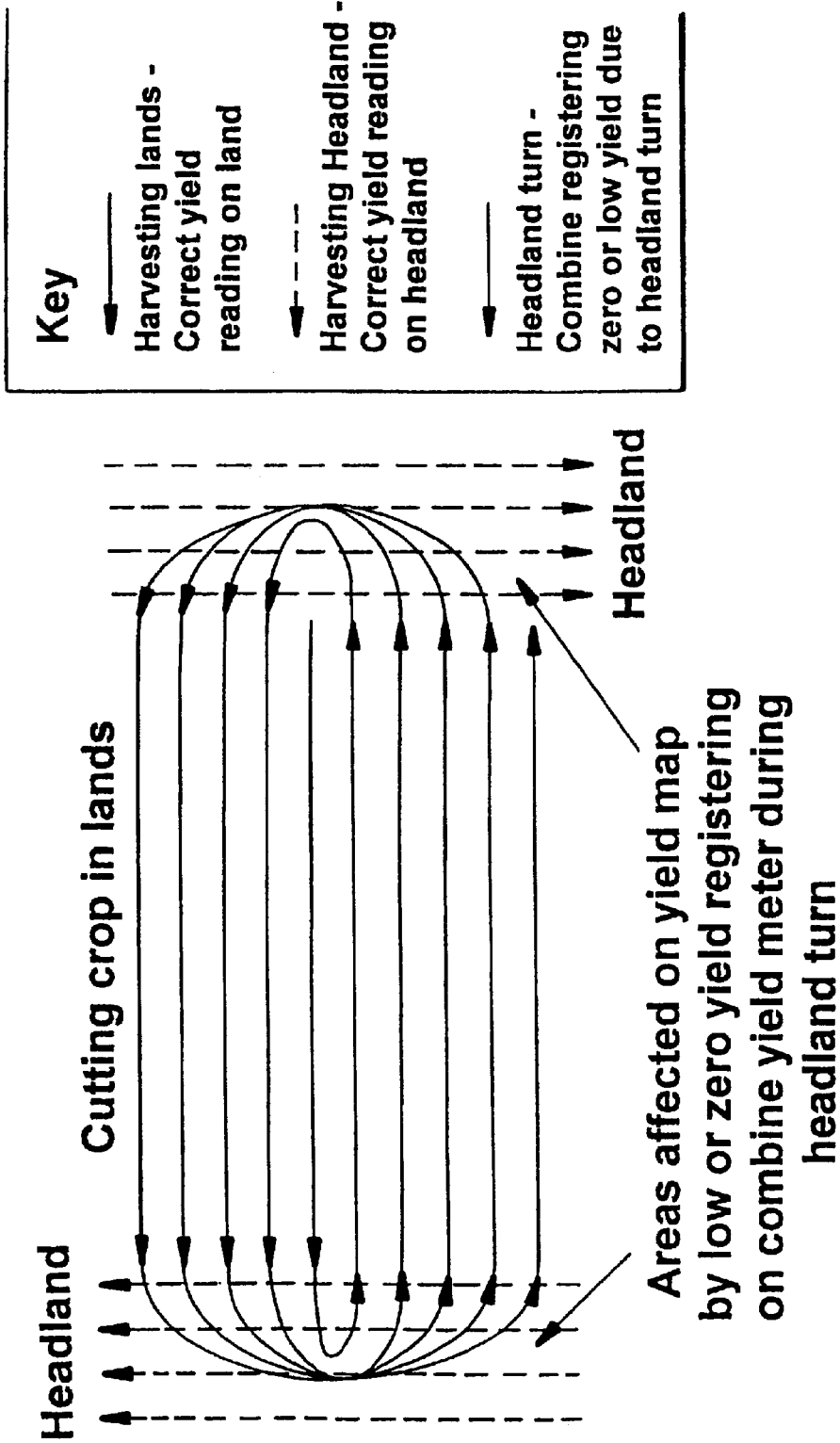
FIG. 21 is a schematic illustration of the potential errors due to turning on headlands with the combine empty and still recording raw yield map data.

FIG. 19 illustrates a yield map showing the occurrence of lag time errors. FIG. 20 illustrates section "XX" of the yield map shown in FIG. 19. Plot (a) represents interpolated data, whereas plot (b) represents raw data, the difference between the two representing the error in the yield map at section "XX" due to lag time errors.

FIG. 20 illustrates the effect of lag time errors on the interpolation of raw data into a yield map. Interpolation smoothes out lag time errors. Line k indicates the average yield obtained from the raw yield data, recorded by the yield mapping system during harvesting. The headland although harvested first, shows a similar yield level to the rest of the field. The end of a harvest run is represented along the "x" axis, and indicates a falling yield at the end because of lag time errors, i.e. the combine has pulled out of the crop and has started a headland turn which gives a false reading on the yield meter as the combine empties of grain.

Line l indicates the yield levels in the field once the raw data, including any errors, has been interpolated by the yield mapping software.

Known yield mapping systems do attempt to avoid some of the problems described above. For example, the Massey Ferguson® yield mapping system will only record data if certain criteria are met. For example, the combine must be travelling at more than 1 km/h with the threshing mechanism and cutter bar engaged. The cutter bar must also be below 50 cm. The second feature is a filter built into the software which sorts and deletes potential errors in the raw data from the combine. Data containing very high and very low yield values are found by the filter and deleted. The filter simply sums all the yield values in the raw data file to find the average yield value. The average yield value is divided by 2 to find the lower limit and multiplied by 1.5 to find the upper limit. For example, if the average yield in a raw data file was 10 t/ha, then all data below 5 t/ha and above 15 t/ha would be deleted.

If, however, the raw data file contains low incorrect yield data from headland turns, because the operator did not lift the cutter bar above 50 cm, the average yield value calculated by the filter would be affected as it would be artificially low. This would, in turn, influence the filter limits which control which data is valid and which is not.

In general, yield mapping systems generate large volumes of data, typically one sample is taken every 4 to 5 meters. As the data is so dense, it is possible to delete some data and still have enough remaining to produce a robust yield map.

The invention aims to provide a yield monitor, which overcomes the problems associated with known yield meters.

SUMMARY OF THE INVENTION

The invention provides a method of collecting yield data from a harvesting machine comprising the steps of:
a) establishing a first data set comprising raw data by recording yield and position data periodically at data points when the harvesting machine is in a harvesting area;
b) tagging each data point with a code indicative of a harvesting status of the said harvesting machine;

c) applying a filter to the first data set to create a second data set, wherein invalid data is removed by the filter.

Advantageously, the invention records all data whilst the combine harvester is in the harvesting area, for example a field, and subsequently applies a filter to the data set in order to filter out erroneous data.

When the filter is applied to one specific data point in the data set, the filtered data, the yield of the filtered data is compared with an average of a number of data in the data set preceding or following the filtered data. If the yield of the filtered data is below a desired filter threshold, then the data is rejected as being erroneous.

For example, the filter when used to identify lead or lag time errors may use the following algorithm:

$$y\% > x1[(x2+x3+x4+x5+x6 \ldots +xA)/n]*100$$

where y=filter threshold x1=the filtered data x2, x3, x4, x5, x6 and xA=the preceding or following yield meter readings in the harvest run and "n" is the number of meter readings in the series x2 to xA.

Advantageously, "n" is equal to 5.

The filter threshold value may be set at 95%, so that only when the filtered data yield exceeds 95% of the preceding or following n yield readings will it be recorded as valid data and recorded in the second data set, which may then be used in yield mapping.

At the end of a harvesting run, there is a phase during which the combine empties of grain. During this phase yield errors can occur in the prior art methods and devices. Again the filter is applied to remove these errors from the data set. The algorithm above is applied but rather than the filtered data being compared with an average of the next five readings in the data set, is compared with the previous five readings.

Further preferable features are described in the claims appended hereto.

The method and device of the invention are advantageous over the prior art insofar as they collect all yield data and then remove errors from the collected data, whereas the prior art devices attempt to exclude some erroneous data from the data set, and then reduce the effect of any remaining errors on the yield map by interpolation.

DESCRIPTION OF THE FIGURES FOR THE PREFERRED EMBODIMENTS

Figure 22:
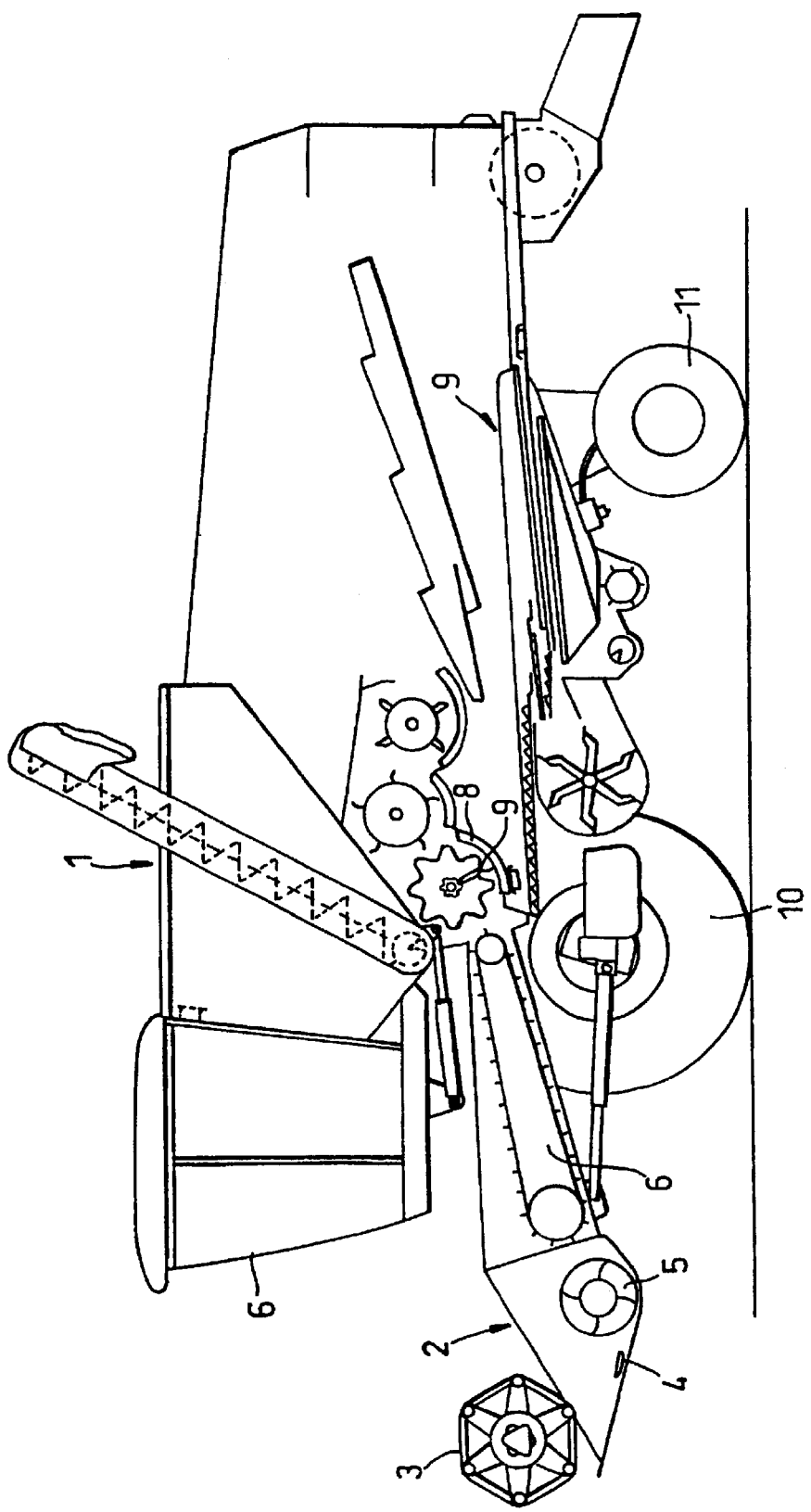
Figure 23:
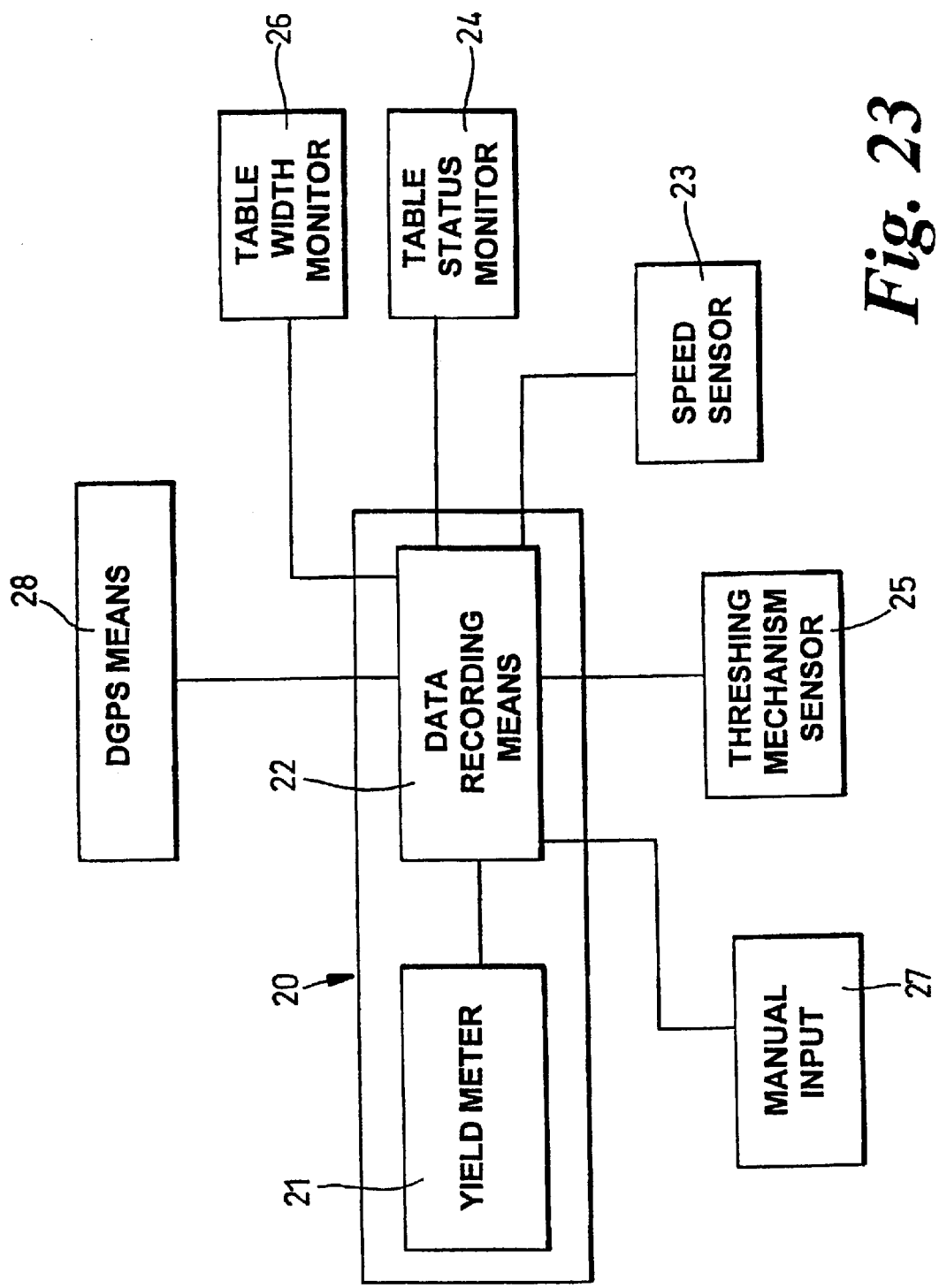
Figure 24:
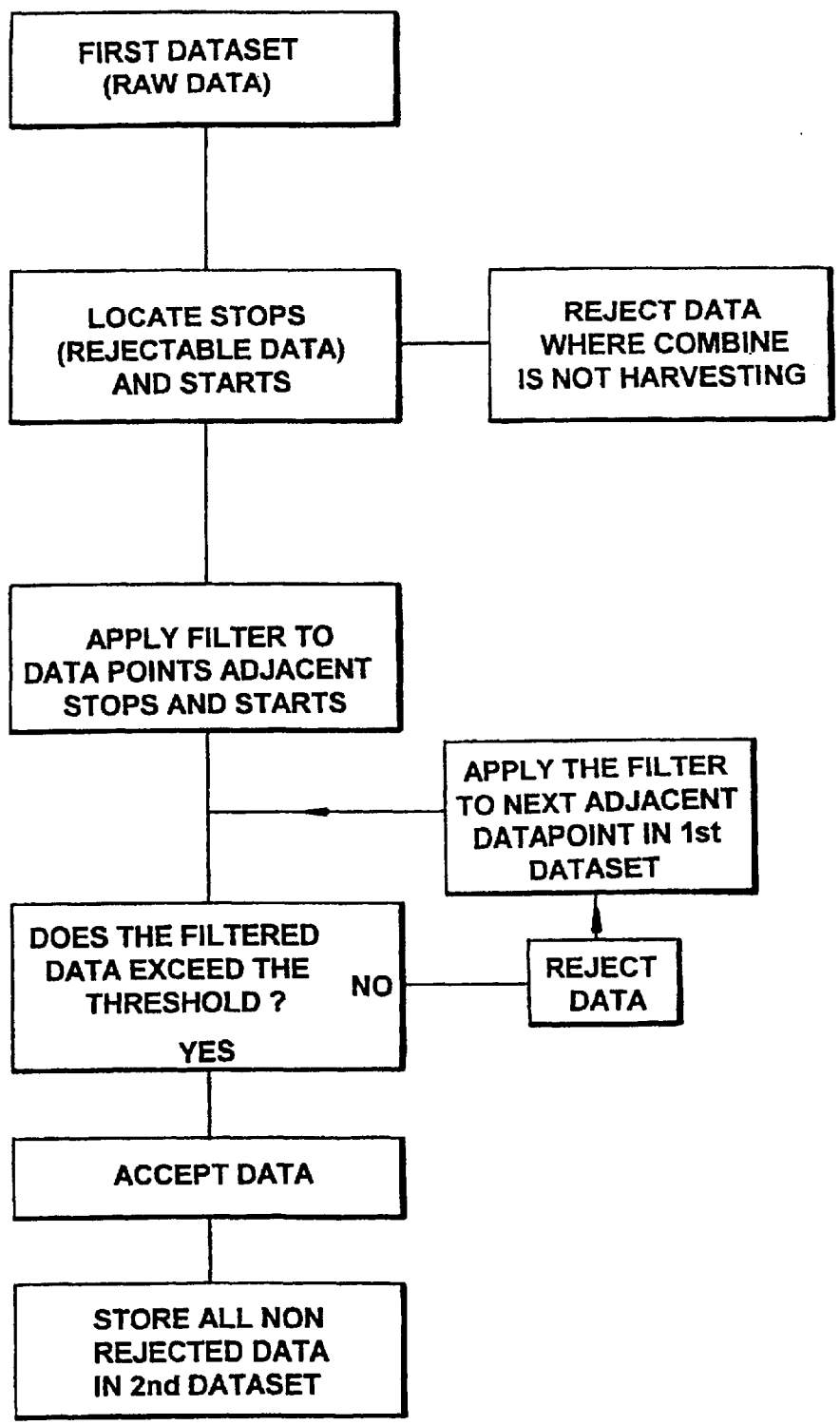

In the drawings, which illustrate preferred embodiments of the invention:

FIG. 22 is a schematic representation of a combine harvester;

FIG. 23 is a block diagram of the yield monitor;

FIG. 24 is a flow chart showing how collected data is filtered; and

Figure 25:
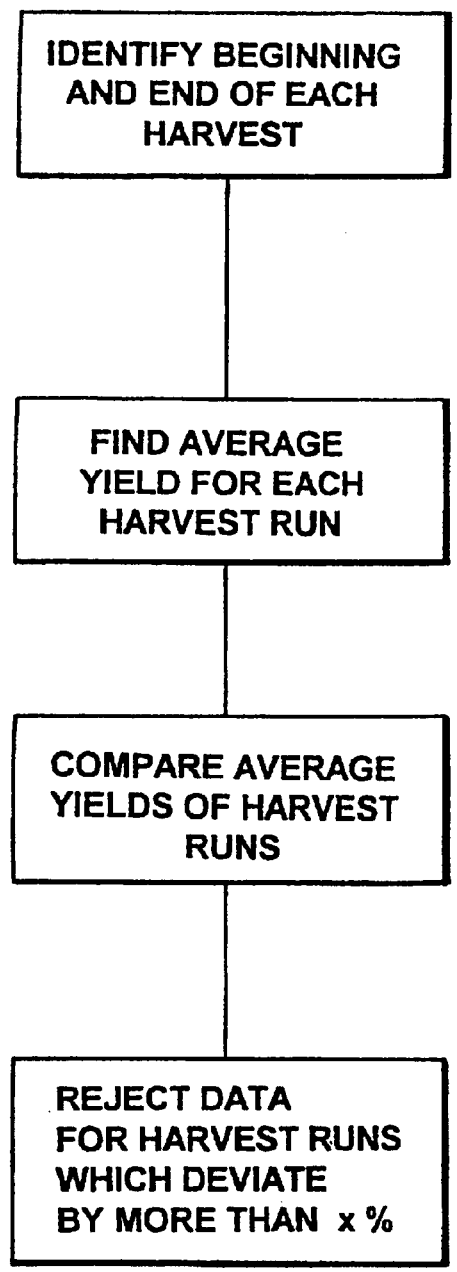

FIG. 25 is a flow chart showing how collected data is filtered to remove inaccurate data due to false cutting widths.

DETAILED DESCRIPTION OF THE INVENTION

The invention provides a method of collecting the yield data for a harvested crop. This is done by recording data generated as a harvesting machine, for instance a combine harvester as shown in FIG. 22, traverses a harvesting area. Data is recorded continuously when the harvester is in the harvesting area, irrespective of whether the combine is harvesting or not.

The harvester 1 comprises a table 2 having a reel 3, a cutter bar 4, and a feed auger 5. An elevator 6 lifts harvested crop material from the table 2 to the threshing mechanism 7, which comprises a concave 8 and a drum 9. As can be seen from FIG. 22, the combine harvester is mounted on front and rear pairs of wheels 10, and 11.

The combine harvester 1 further comprises a plurality of sensors arranged to sense crop yield, the position of the combine harvester, and also the status of various elements of the combine harvester.

The combine harvester 1 is equipped with a yield monitor 20 comprising a yield meter 21, data recording means 22, speed sensor 23 which measures the speed of rotation of one of the front wheels 10, a table status sensor 24 which senses whether the table 2 is above or below a threshold height above the ground and whether the cutter bar 4 is operative or inoperative, a threshing mechanism sensor 25 which senses drum speed, a table width monitor 26, at least one manual input 27, and a DGPS means 28, outputs of which are connected to a data recording means 22, as is illustrated in FIG. 23.

The DGPS input to the data recording means provides position data so that the yield at any one data recording point can be associated with the position of the combine harvester 1, thereby enabling the yield data to be useful in establishing a yield map. The DGPS means also includes means to generate a signal indicative of the quality of the position data provided thereby.

The yield monitor 20 may be of the type described in International Patent application No. 96/38714.

The yield monitor is programmed for delay for yield, and delayed positioning as described above. Means to allow the operator to vary the periods of these delays may be provided.

When the operator takes the combine harvester 1 into a crop harvesting area (which may be a field or a part of a field), before beginning to harvest the crop he switches the yield monitor 20 on. The data recording means begins to record data periodically at data points, for example at one second intervals.

The data recording 22 means receives continuous inputs from the yield meter 21, the speed sensor 23, the table sensor 24, the threshing mechanism sensor 25, the table width monitor 26, the manual input 27, and the DGPS means 28. Each data point therefore comprises yield information and information about the status of various functions of the combine harvester.

Data received from the sensor elements 21 to 28 is encoded by the data recording means 22. The data from each sensory element 21 to 28 is given one of two possible codes which indicate whether the parameter measured is above or below a threshold value. For example, if the output from the speed sensor 23 is greater than 1 km/h then the data will be encoded "harvesting" whereas if the output from the speed sensor shows a forward speed of less then 1 km/h then the data will be encoded "not harvesting". Likewise, if the table status sensor 24 shows that the table is below 50 cm then the data from this sensor will be encoded "harvesting" whereas if the table height is above 50 cm then the data will be encoded "not harvesting". In the data set the status of "harvesting" or "not harvesting" would be recorded as 1 or 0. By tagging each data point it is possible to interpret from the first data set where the combine harvester was harvesting and where it was not.

The sequence of steps in the filtering process of the preferred embodiment is as follows, and as shown in the flow chart of FIG. 24:

Step 1: identify the data points in the first data set tagged as "not harvesting" and reject these data points;

Step 2: apply the algorithm to the data points to either side of the rejected data points;

if the harvesting status changes from "harvesting" to "not harvesting" apply the algorithm to the data points preceding the rejected data;

if the harvesting status changes from "not harvesting" to "harvesting" apply the algorithm to the data points following the rejected data.

Step 3: If the operators manual input button is depressed tag the data points as inaccurate data—reject so tagged data points.

Step 4: Find the average yield for each harvest run;

Step 5: Compare the averages of each harvest run and reject data for any harvest run where the average yield is below a threshold value.

Step 6: Compare DGPS quality with a threshold value and reject the data point if the DGPS quality is below said threshold value.

Step 7: Store all non rejected data in a second data set.

Through research it is known that many of the errors found in yield maps are generated when harvesting stops and starts.

To improve the reliability of yield maps, the method of the invention identifies where the harvesting status changes and then applies the algorithm described below to the data points either side of the stops and starts. The algorithm is re-iterated until the yield of the filtered raw data is 95% of the average yield at the data points preceding or following the filtered raw data.

By executing steps 1 to 7 the filter eliminates all data from the first data set recorded when the harvesting machine was not harvesting.

Another source of inaccurate data is caused by the cutter bar not harvesting crop across its full width. In some circumstances the cutter bar may not harvest across its full width due to operator error. In other cases the problem is unavoidable, for example when cutting a three cornered area of crop or when harvesting in lands. The invention provides two solutions to this problem. The first is the provision of a manual input so that the combine operator can mark the data as inaccurate by depressing a button for instance. The problem associated with this first solution is that when operators suffer from fatigue they may well forget to activate the manual input. The second solution avoids the problem of driver fatigue by processing the data collected during harvesting. First the average yield/unit area for each harvesting run is calculated. Harvesting runs are simple to identify in the data set because the raising and lowering of the header is recorded. In general there will not be significant differences between the average yields from adjacent harvesting runs. However, if the cutter bar is not cutting at or close to its fill width a low yield will show up. Where low yielding harvesting runs are identified, these can be removed from the first data set by the filtering process.

The method of the invention also allows erroneous data due to poor DGPS quality to be detected and removed. This is achieved by monitoring GPS quality and removing the data points where GPS quality is below a threshold value. GPS quality relates to whose satellites are in the sky and is assessed using HDOP. HDOP (Horizontal Dilution of Precision) is a known method of measuring GPS quality and as such will not be described herein.

Referring now to FIG. 3, the flow chart shows the steps of the algorithm used to filter the data collected by the yield monitor. The algorithm is applied to data in the first data set before and after locations where the combine was "not harvesting" and tests whether the filtered data exceeds a threshold value, for example 95% of the average of the preceding or following data. If the threshold is exceeded the filtered data is stored in a second data set, and the algorithm does not need to be applied to the next adjacent data point in the first data set. If the yield indicated by the filtered data does not exceed the threshold value it is rejected. The algorithm is then applied to the next adjacent data point in the data set. If the filtered data does not exceed the threshold value, the algorithm is applied to the next data point in the first data set, and so on until a data point is reached where the yield exceeds the threshold value.

It has been found that the filtering of raw data prior to interpolation thereof is much improved if data is available to indicate how the crop was harvested, e.g. where headland turns were made, where the combine stopped due to blockage etc. By encoding to data from each of the sensors, filtering software can identify probable erroneous data, and remove such data before interpolation.

What is claimed is:

1. A method of collecting yield data from a harvesting machine comprising the steps of
    a) establishing a first data set comprising raw data by continuously recording yield and position date periodically at data points when the harvesting machine is in a harvesting area;
    b) tagging data points with a code indicative of the status of a harvesting parameter of the said harvesting machine;
    c) applying a filtering process to the first data set to create a second data set, wherein invalid data is removed by the filtering process.

2. A method according to claim 1, wherein data points are tagged to indicate the status of at least one of the parameters of the group comprising: the crop gathering means, the separating mechanism, forward speed, harvesting width, a manual input, and position identification quality.

3. A method according to claim 1, wherein the filter applies an algorithm to a selected raw data in the first data set, the filtered raw data, and wherein the algorithm compares the value of the filtered raw data with a selected number (n) of data immediately before and/or after the filtered raw data in the first data set.

4. A method according to claim 3, wherein the algorithm compares the values of the filtered raw data with an average of a selected number (n) of raw data immediately before and/or after the filtered raw data in the first data set.

5. A method according to claim 3, wherein the selected number (n) of raw data is between 2 and 10.

6. A method according to claim 5, wherein the selected number (n) of raw data is 5.

7. A method according to claim 1, wherein said filtering process comprises the step of identifying all data points in the filtering process where the status of at least one harvesting parameter indicates that the harvester is not harvesting, and wherein all so identified data points are removed by the filtering process.

8. A method according to claim 7 wherein the said selected raw data to which the algorithm is applied are the data points on either side of the rejected data.

9. A method according to claim 8, wherein if the status of the harvesting parameters changes from "harvesting" to "not harvesting" then the algorithm is applied to the data points preceding the rejected data, and if the status of the harvesting parameters changes from "not harvesting" to "harvesting" then the algorithm is applied to the data points following the rejected data.

10. A method according to claim 1, wherein the filtering process includes the steps of establishing the average yield for each harvesting run, comparing the average yields of respective harvesting runs, and filtering out from the data set the data for any harvesting run where the average yield is below a threshold yield.

11. A method according to claim 1, wherein data points recorded when the manual input means is activated are marked as inaccurate, and the said filtering process removes so marked data points.

12. A method according to claim 1, wherein the position identification means is a DGPS signal, and at each data point DGPS quality or a parameter indicative of DGPS quality is recorded, said DGPS quality being compared with a threshold value, and wherein the filtering process removes those data points where the DGPS quality falls below the said threshold value.

13. A method according to claim 1, further comprising a step of interpolating the second data set to establish a yield map.

14. A method according to claim 1, wherein raw data is recorded at one second intervals.

15. A method according to claim 1, wherein each data point is tagged with a code indicative of the harvesting status of a harvesting parameter of the said harvesting machine.

16. A method according to claim 1, wherein only selected data points are tagged with a code indicative of the harvesting status of a harvesting parameter of the said harvesting machine, the selected data points being at or adjacent to data points where the status of a harvesting parameter has changed.

17. A method according to claim 1, wherein the harvesting machine is a combine harvester.

18. A method according to claim 1, wherein recording raw data to establish the first data set takes place on the harvesting machine, or data is transmitted from the harvesting machine to a remote data recording means.

19. A method according to claim 1, wherein filtering of the first data set to establish the second data set takes place on a remote data processing means.

20. A method according to claim 1, wherein the said algorithm has a filter threshold of y percent, where:

$$y < x1[x2+x3+x4+x5+x6 \ldots +xA)/n]*100;$$

x1 is the filtered data; and x2, x3, x4, x5, x6 and xA are the preceding or the following meter readings in the harvesting run and "n" is the number of meter readings x2 to xA in the series.

21. Apparatus for performing the method as claimed in claim 1, the apparatus comprising a yield monitor, said yield monitor including:

a) data recording means;

b) a yield meter; and c) at least one harvester status indicator, wherein the data recording means periodically records data from said yield meter and the said at least one harvest status indicator.

22. Apparatus according to claim 21, wherein the or each at least one status indicator is selected from the group comprising: the crop gathering means, the separating mechanism, forward speed, a manual input, harvesting width, and position indicator quality.

23. Apparatus according to claim 21, further comprising filtering means to filter the data recording by the data recording means.

24. Apparatus according to claim 23, wherein the filtering means comprises a filtering program.

* * * * *